US012701145B2

(12) United States Patent
Mathew et al.

(10) Patent No.: US 12,701,145 B2
(45) Date of Patent: Aug. 4, 2026

(54) SINGLE PANE DISTRIBUTED NETWORKING AND SECURITY FOR BARE METAL AND OVERLAY WORKLOADS

(71) Applicant: VMware LLC, Palo Alto, CA (US)

(72) Inventors: Subin Cyriac Mathew, San Jose, CA (US); Chidambareswaran Raman, Sunnyvale, CA (US); Mukesh Hira, Palo Alto, CA (US)

(73) Assignee: VMware LLC, Palo Alto, CA (US)

( * ) Notice: Subject to any disclaimer, the term of this patent is extended or adjusted under 35 U.S.C. 154(b) by 118 days.

(21) Appl. No.: 18/381,869

(22) Filed: Oct. 19, 2023

(65) Prior Publication Data

US 2025/0133116 A1      Apr. 24, 2025

(51) Int. Cl.
| | |
|---|---|
| *H04L 9/40* | (2022.01) |
| *G06F 9/455* | (2018.01) |
| *G06F 15/16* | (2006.01) |
| *H04L 12/46* | (2006.01) |
| *H04L 15/16* | (2006.01) |
| *H04L 45/74* | (2022.01) |
| *H04L 49/00* | (2022.01) |

(52) U.S. Cl.
CPC .......... *H04L 63/20* (2013.01); *G06F 9/45541* (2013.01); *G06F 9/45558* (2013.01); *G06F 2009/4557* (2013.01); *G06F 2009/45587* (2013.01); *G06F 2009/45595* (2013.01)

(58) Field of Classification Search
CPC ..... H04L 63/20; H04L 45/38; H04L 41/0895; H04L 63/0227; H04L 63/0272; H04L 41/0894; G06F 9/45541; G06F 9/45558; G06F 2009/4557; G06F 2009/45587; G06F 2009/45595

USPC ............................................................. 726/7
See application file for complete search history.

(56) References Cited

U.S. PATENT DOCUMENTS

| | | | | |
|---|---|---|---|---|
| 8,639,783 B1 * | 1/2014 | Bakke | ..................... | H04L 49/70 |
| | | | | 710/316 |
| 10,476,850 B2 * | 11/2019 | Pillai | ........................ | H04L 45/16 |
| 11,316,837 B2 * | 4/2022 | Pillai | ........................ | H04L 45/16 |
| 11,474,827 B1 * | 10/2022 | Razdan | ............... | G06F 9/45558 |

(Continued)

FOREIGN PATENT DOCUMENTS

WO      WO-2015187201 A1 * 12/2015      ......... H04L 63/0227

OTHER PUBLICATIONS

Anonymous, VMware NSX-T(R) Reference Design Guide, Software Version 2.0, 2018, 117 pages.

(Continued)

*Primary Examiner* — Berhanu Shitayewoldetsadik
(74) *Attorney, Agent, or Firm* — Kim & Stewart LLP

(57) ABSTRACT

Some embodiments provide a novel method for defining a set of policies for a set of applications executing on a host computer of a software-defined network (SDN). The method configures, on a physical network interface card (PNIC) connected to the host computer, a network adapter to create a logical port that connects an interface of the host computer to a virtual distributed switch (VDS) executing on the PNIC. The method defines the set of policies based on the logical port for the VDS to apply to data message flows sent from the set of applications on the host computer to one or more other host computers of the SDN.

20 Claims, 14 Drawing Sheets

(56)　　　　　　References Cited

U.S. PATENT DOCUMENTS

| | | | |
|---|---|---|---|
| 2013/0336134 A1* | 12/2013 | Bao | H04L 49/70 |
| | | | 370/252 |
| 2014/0241353 A1* | 8/2014 | Zhang | H04L 45/74 |
| | | | 370/392 |
| 2018/0032561 A1* | 2/2018 | Bodziony | G06F 16/2219 |
| 2018/0123954 A1* | 5/2018 | Jiang | H04L 49/70 |
| 2018/0210750 A1* | 7/2018 | Cui | H04L 49/70 |
| 2019/0020684 A1* | 1/2019 | Qian | H04L 63/205 |
| 2019/0028442 A1* | 1/2019 | Pillai | H04L 9/14 |
| 2019/0068476 A1* | 2/2019 | Ranjit | H04L 43/12 |
| 2019/0173771 A1* | 6/2019 | Behera | H04L 41/142 |
| 2019/0238508 A1* | 8/2019 | Hira | H04L 63/20 |
| 2020/0195542 A1* | 6/2020 | Behera | H04L 41/142 |
| 2020/0195607 A1* | 6/2020 | Wang | H04L 63/0236 |
| 2020/0280534 A1* | 9/2020 | Rajendran | H04L 45/02 |
| 2021/0029087 A1* | 1/2021 | Uy | H04L 12/4633 |
| 2021/0200572 A1* | 7/2021 | Zhang | H04L 61/256 |
| 2022/0029934 A1 | 1/2022 | Jiang et al. | |
| 2022/0103487 A1* | 3/2022 | Ang | H04L 45/38 |
| 2022/0400151 A1* | 12/2022 | Kottapalli | H04L 45/586 |

OTHER PUBLICATIONS

Conole, A. et al., Open vSwitch Documentation, Release 2.6.0, Open vSwitch Developers, 2017, 261 pages.
Luo, Y. et al., Accelerated Virtual Switching with Programmable NICs for Scalable Data Center Networking, In Proceedings of the Second ACM SIGCOMM Workshop on Virtualized Infrastructure Systems and Architectures, 2010, pp. 65-72.
European Patent Office, Extended Search Report, Application No. 24207157.9, Feb. 28, 2025, 13 pages.

* cited by examiner

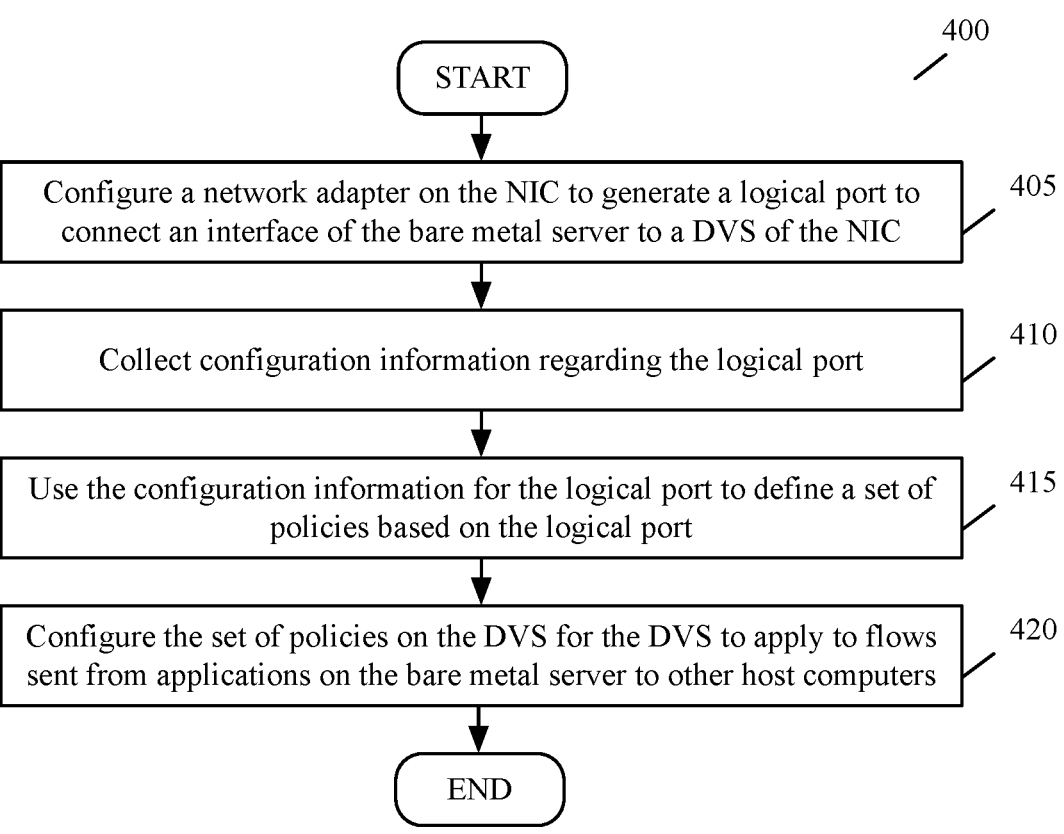

400

START

Configure a network adapter on the NIC to generate a logical port to connect an interface of the bare metal server to a DVS of the NIC          405

Collect configuration information regarding the logical port          410

Use the configuration information for the logical port to define a set of policies based on the logical port          415

Configure the set of policies on the DVS for the DVS to apply to flows sent from applications on the bare metal server to other host computers          420

END

*Figure 4*

START

Receive a data message of a flow
905

Flow record for flow?
910

Yes

No

Process the data message according to the flow record
915

Provide the data message to the VDS of the PNIC
920

Receive the processed data message from the VDS
925

Forward the processed data message to its destination
930

END

900

SINGLE PANE DISTRIBUTED NETWORKING AND SECURITY FOR BARE METAL AND OVERLAY WORKLOADS

BACKGROUND

Currently, legacy enterprise applications are not modernized into virtualized workloads, as it is challenging, risky, and cost-prohibitive to do so. However, such applications that execute on bare metal servers (e.g., legacy database applications) are needed in some cases to communicate with other virtualized workloads in a datacenter. Because of this, some network administrators use both non-virtualized workloads on bare metal servers and virtualized workloads (e.g., virtual machines (VMs)) on host computers in a single network.

Management servers of such a network are unable to apply the same policies to both host computers and bare metal servers. There have been other solutions to apply policies to bare metal servers, such as deploying Tier-0 gateways, deploying bridges, or integrating multiple networking solutions from different vendors. However, these solutions result in performance bottlenecks and integration/configuration issues. Hence, methods and systems are needed for applying networking and security policies to both bare metal servers and host computers in a distributed manner.

BRIEF SUMMARY

Some embodiments provide a novel method for defining a set of policies for a set of applications executing on a host computer of a software-defined network (SDN). The method configures, on a physical network interface card (PNIC) connected to the host computer, a network adapter to create a logical port that connects an interface of the host computer to a virtual distributed switch (VDS) executing on the PNIC. The method defines the set of policies based on the logical port for the VDS to apply to data message flows sent from the set of applications on the host computer to one or more other host computers of the SDN.

The method is performed in some embodiments by a set of one or more management servers implementing a manager of the SDN. In such embodiments, the manager connects to the PNIC through a management interface of the PNIC.

In some embodiments, the host computer is a bare metal server that is incapable of applying the set of policies to the data message flows. In such embodiments, the set of applications is a set of legacy applications, which are non-virtualized applications. As such, the manager cannot apply the set of policies directly to the bare metal server, and has to apply the set of policies on the PNIC connected to the bare metal server. The set of policies includes at least one of networking policies and security policies to apply to the data message flows. Using these networking and/or security policies, the PNIC can process flows exchanged between the bare metal server and one or more other host computers.

Before defining the set of policies, some embodiments receive configuration information regarding the logical port to use to define the set of policies. In such embodiments, the manager receives the configuration information from a set of one or more controllers of the SDN, which received it from a management agent that created the logical port (as directed by the manager). The configuration information in some embodiments specifies a network address (e.g., an Internet Protocol (IP) address) of the logical port. Any other suitable configuration information regarding the logical port can be included. Using this configuration information, the manager defines the set of policies based on the logical port.

In some embodiments, the host computer (which is a bare metal server, in some embodiments) views the PNIC as a Peripheral Component Interconnect Express (PCIe) device connected to the host computer. PCIe is a high-speed expansion bus standard that is commonly used to connect various hardware components to a computer's motherboard. It can connect various hardware components to a computer, including general processing units (GPUs), NICs, and storage adapters. The bare metal server view the PNIC as a PNIC itself, which is a PCIe device.

The logical port in some embodiments connects to the interface of the host computer through an embedded switch of the PNIC. In such embodiments, the embedded switch is a hardware switch of the PNIC and connects to the interface of the host computer through a virtual function (VF) of a physical function (PF) of the PNIC. The VF is a virtualized PCIe function exposed as an interface of the PNIC, and the PF is a physical interface of the PNIC. The PF can execute any number of VFs. The logical port connects to the embedded switch through a representor port of the PNIC.

The embedded switch is configured in some embodiments to (1) receive a particular data message of a particular data message flow from a particular application, (2) determine that it does not store a flow record for the particular data message flow, and (3) provide the particular data message to the VDS through the logical port. In such embodiments, the embedded switch stores flow records for different flows that the embedded switch can use to process flows. In some embodiments, each flow record specifies a flow identifier (ID) (e.g., five-tuple or other unique ID) and a set of one or more actions to perform on the data messages of the flow. When the embedded switch determines that it does not store a flow record for the particular flow from the particular application, the embedded switch provides the particular data message to the VDS for processing.

The VDS is configured to, based on the set of policies, perform a set of one or more operations on the particular data message including a particular operation to encapsulate the particular data message with an encapsulating header specifying one or more virtual tunnel endpoints (VTEPs). In such embodiments, the VDS identifies which policies are applicable to the particular flow and applies the applicable policies to the particular data message.

The VTEP encapsulation operation is performed in some embodiments to encapsulate the particular data message with its source VTEP. Conjunctively or alternatively, the VTEP encapsulation operation is performed in some embodiments to encapsulate the particular data message with its destination VTEP. The encapsulating header is in some embodiments a Generic Network Virtualization Encapsulation (Geneve) header.

In some embodiments, the VDS is further configured to provide the encapsulated particular data message to the embedded switch. After processing the data message, the VDS provides the encapsulated particular data message back to the embedded switch for forwarding. In such embodiments, the embedded switch is further configured to forward the encapsulated particular data message to a destination of the particular data message.

The set of operations performed by the VDS on the particular data message in some embodiments includes one or more middlebox service operations. Examples of middlebox service operations include firewall services, load balancing services, network address translation (NAT) services, intrusion detection system (IDS) services, and intrusion prevention system (IPS) services. In such embodiments, the VDS performs one or more middlebox service operations on the particular data message based on one or more policies that specify performing these one or more middlebox service operations on the particular data message flow.

In some embodiments, the VDS is further configured to (1) determine a set of actions to perform on the particular data message flow based on the set of operations performed on the particular data message, (2) generate a particular flow record for the particular data message flow specifying a flow identifier and the set of actions, and (3) provide the flow record to the embedded switch. In such embodiments, the VDS creates the particular flow record to offload the particular flow's processing from the VDS to the embedded switch. in some embodiments, the VDS also stores the flow record in a local data store.

The embedded switch in such embodiments is further configured to use the particular flow record to perform the set of actions on subsequent data messages of the particular data message flow. As such, the embedded switch processes the subsequent data messages of the particular flow such that the VDS does not see or process the subsequent data messages of the particular flow.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description, and Drawings.

BRIEF DESCRIPTION OF THE DRAWINGS

The novel features of the invention are set forth in the appended claims. However, for purposes of explanation, several embodiments of the invention are set forth in the following figures.

FIG. 4 conceptually illustrates a process of some embodiments for applying policies for a set of applications executing on a bare metal server of an SDN.

DETAILED DESCRIPTION

Figure 1:
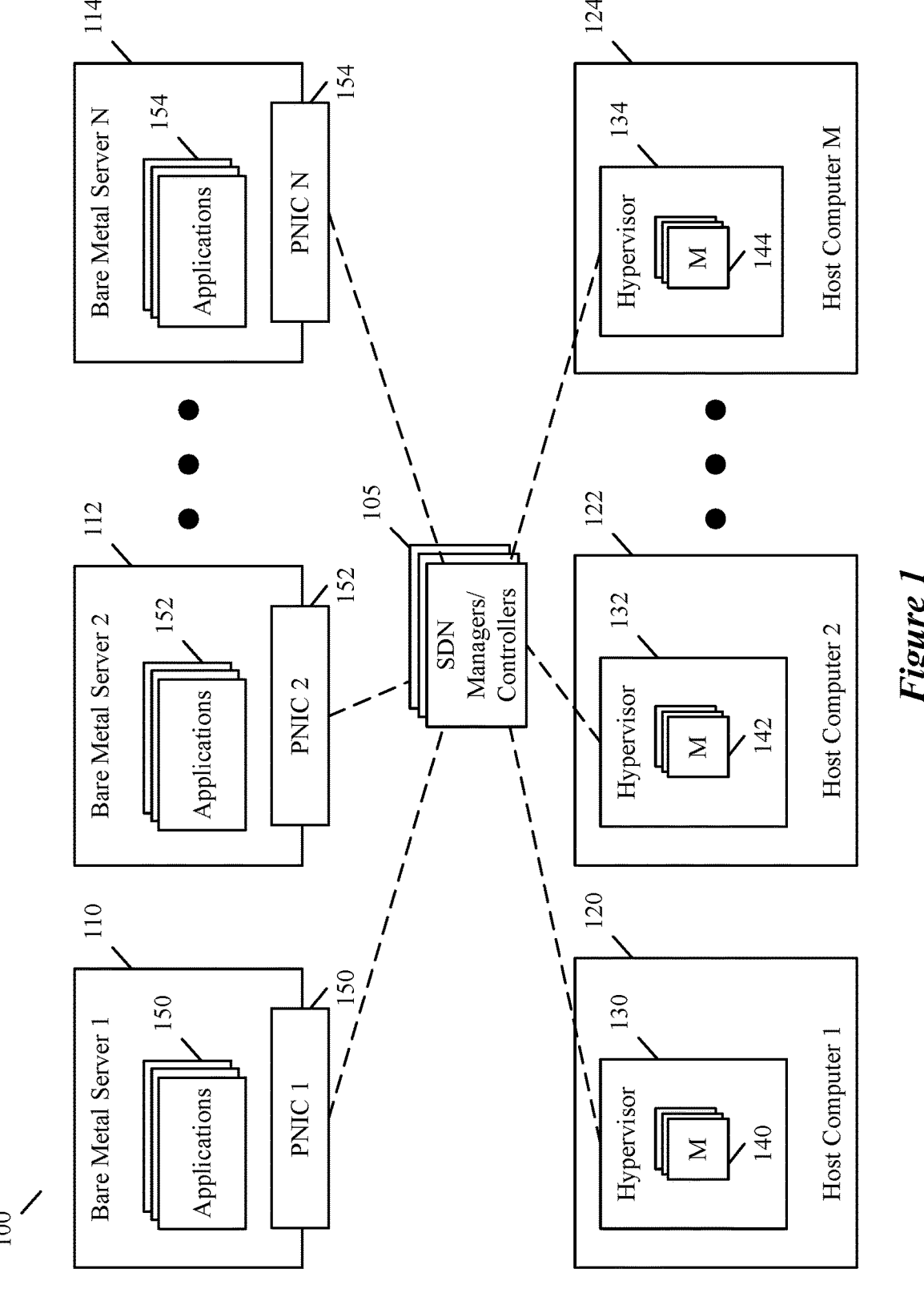
FIG. 1 illustrates an example SDN of some embodiments of the invention.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel method for defining a set of policies for a set of applications executing on a host computer of a software-defined network (SDN). The method configures, on a physical network interface card (PNIC) connected to the host computer, a network adapter to create a logical port that connects an interface of the host computer to a virtual distributed switch (VDS) executing on the PNIC. The method defines the set of policies based on the logical port for the VDS to apply to data message flows sent from the set of applications on the host computer to one or more other host computers of the SDN.

The method is performed in some embodiments by a set of one or more management servers implementing a manager of the SDN. In such embodiments, the manager connects to the PNIC through a management interface of the PNIC. In some embodiments, the host computer is a bare metal server that is incapable of applying the set of policies to the data message flows. In such embodiments, the set of applications is a set of legacy applications, which are non-virtualized applications. As such, the manager cannot apply the set of policies directly to the bare metal server, and has to apply the set of policies on the PNIC connected to the bare metal server.

The set of policies includes at least one of networking policies and security policies to apply to the data message flows. Using these networking and/or security policies, the PNIC can process flows exchanged between the bare metal server and one or more other host computers. In some embodiments, the host computer (which is a bare metal server, in some embodiments) views the PNIC as a Peripheral Component Interconnect Express (PCIe) device connected to the host computer.

The VDS is configured to, based on the set of policies, perform a set of one or more operations on the particular data message including a particular operation to encapsulate the particular data message with an encapsulating header specifying a virtual tunnel endpoint (VTEP). In such embodiments, the VDS identifies which policies are applicable to the particular flow and applies the applicable policies to the particular data message.

The VTEP encapsulation operation is performed in some embodiments to encapsulate the particular data message with its source VTEP. Conjunctively or alternatively, the VTEP encapsulation operation is performed in some embodiments to encapsulate the particular data message with its destination VTEP. The encapsulating header is in some embodiments a Generic Network Virtualization Encapsulation (Geneve) header.

In some embodiments, the VDS is further configured to provide the encapsulated particular data message to the embedded switch. After processing the data message, the VDS provides the encapsulated particular data message back to the embedded switch for forwarding. In such embodiments, the embedded switch is further configured to forward the encapsulated particular data message to a destination of the particular data message.

The set of operations performed by the VDS on the particular data message in some embodiments includes one or more middlebox service operations. Examples of middlebox service operations include firewall services, load balancing services, network address translation (NAT) services, intrusion detection system (IDS) services, and intrusion prevention system (IPS) services. In such embodiments, the VDS performs one or more middlebox service operations on the particular data message based on one or more policies that specify performing these one or more middlebox service operations on the particular data message flow.

As used in this document, references to L2, L3, L4, and L7 layers (or Layer 2, Layer 3, Layer 4, and Layer 7) are references respectively to the second data link layer, the third network layer, the fourth transport layer, and the seventh application layer of the OSI (Open System Interconnection) layer model. As used in this document, a NIC can be referred to as a PNIC, a smart NIC, or a DPU.

In some embodiments, the PNIC is a smart NIC. The smart NIC, in some embodiments, is a configurable network interface controller that includes a general-purpose central processing unit (CPU) (typically low-power compared to the processor of the computer for which the smart NIC acts as the network interface) in addition to one or more application-specific circuits (e.g., data message processing circuits).

FIG. 1 illustrates an example SDN 100 that is managed and controlled by a set of SDN managers and controllers 105. In some embodiments, the SDN managers and controllers 105 is implemented by a set of management servers that manages the SDN 100 and a set of controllers that configures the SDN 100. In such embodiments, the management server receives information from a network administrator of the SDN 100 and directs the controller set to configure the SDN 100 based on the received information.

The SDN 100 includes a set of bare metal servers 110-114 and a set of host computers 120-124. The SDN 100 can include any number of bare metal servers 110-114 and any number of host computers 120-124. Each host computer 120-124 includes a hypervisor 130-134 that executes a set of one or more machines 140-144. The machines 140-144 can be VMs, containers, or pods. Because these machines 140-144 are virtualized machines, the SDN managers and controllers 105 apply networking and security policies to the hypervisors 130-134 to apply the policies to data message flows associated with the machines 140-144.

Each bare metal server 110-114 executes a set of one or more applications 150-154. Any number of applications 150-154 can execute on each bare metal server 110-[1] 114. In some embodiments, the applications 150-154 are referred to as legacy applications, which are applications that are considered outdated (e.g., because they are built with architecture and methods that are considered outdated). In some of these embodiments, the applications 150-154 are legacy applications because they are not virtualized applications. Because the applications 150-154 are legacy applications, they may not be compatible with newer operating systems, hardware, or functionalities. For example, the SDN managers and controllers 105 cannot directly apply networking and security policies to flows associated with the applications 150-154.

To apply networking and security policies for the applications 150-154, some embodiments connect each bare metal server 110-114 to a PNIC 150-154 and apply the networking and security policies at the PNICs 150-154. In such embodiments, the PNICs 150-154 are smart NICs that can perform networking and security operations for the computers (i.e., the bare metal servers 110-114) to which they are connected. In some embodiments, smart NICs are referred to as data processing units (DPUs). The PNICs 150-154 are connected to the bare metal servers 110-114 as PCie devices. Further information regarding smart NICs will be described below.

By connecting PNICs 150-154 to the bare metal servers 110-114, the SDN managers and controllers 105 can provide distributed networking and security policies to both applications executing on the bare metal servers 110-114 and machines executing on the host computers 120-124. Some embodiments provide a common user interface (UI) for defining and applying such networking and security policies. This common UI in the discussion below is referred to as a single pane.

This UI is provided in some embodiments through a set of one or more web servers, and input received through this UI is translated into management plane commands through the set of web servers or through a set of one or more application servers that processes input received through the web server UI.

These management plane commands are then converted (e.g., by the managers of the SDN managers and controllers 105) into control plane configurations by one or more control plane servers (e.g., the controllers of the SDN managers and controllers 105) that produce configuration data for configuring networking and/or security policies from the input received through the management plane. By providing a common UI for defining policies for both nonvirtualized applications 150-154 of bare metal servers 110-114 (through the PNICs 150-154) and for virtualized machines 140-144 of host computers 120-124 (through the hypervisors 130-134), network administrators have a single pane for defining policies with the SDN managers and controllers 105.

Figure 2:
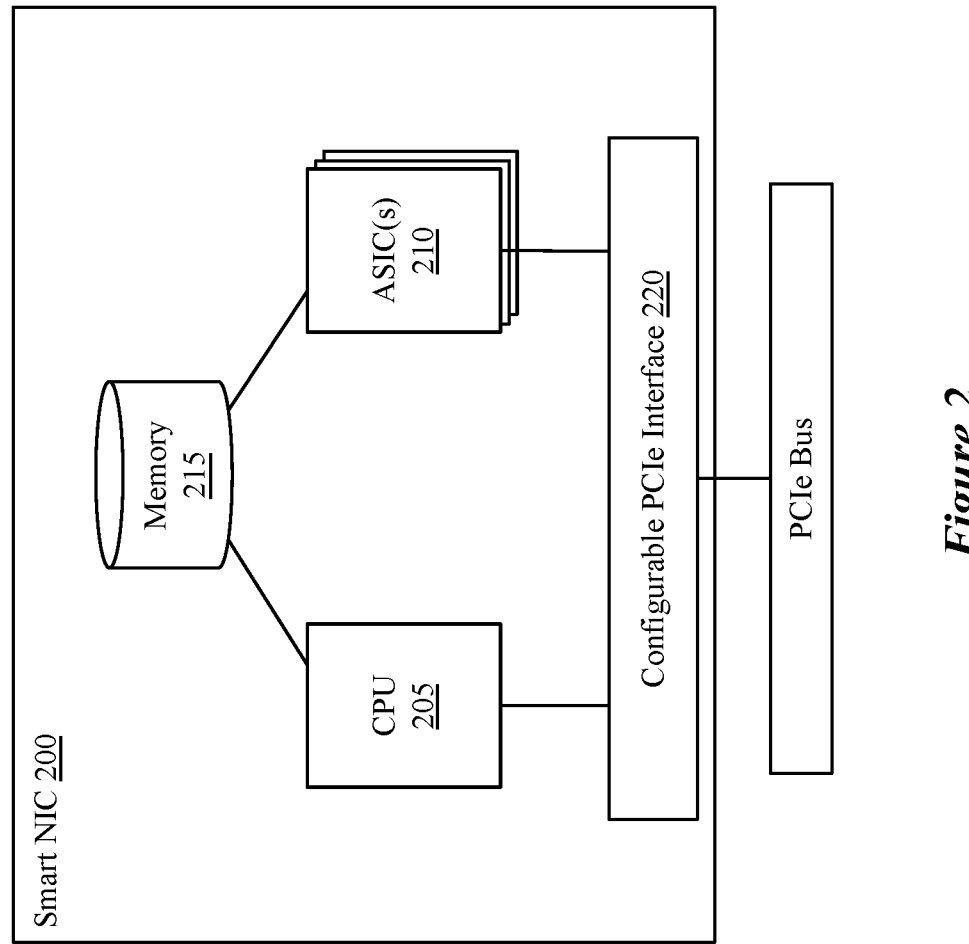
FIG. 2 illustrates the hardware of a smart NIC of some embodiments that can be configured to perform middlebox service offload for a host computer.

FIG. 2 illustrates the hardware of a smart NIC 200 of some embodiments that can be configured to perform networking and service (e.g., middlebox service) offload for a host computer (e.g., a bare metal server). As shown, the smart NIC 200 includes its own general-purpose CPU 205, a set of application-specific integrated circuit (ASICs) 210, a memory 215, and a configurable PCie interface 220. The ASICs 210, in some embodiments, include at least one Input/Output (I/O) ASIC that handles the processing of data messages forwarded to and from the host computer, and are at least partly controlled by the CPU 205. In some embodiments, either in addition to or as an alternative to the ASICs, the smart NIC 200 includes a set of configurable field-programmable gate arrays (FPGAs). Conjunctively or alternatively, the smart NIC 200 includes other accelerators (e.g., cryptographic accelerators) and regular expression engines.

The configurable PCie interface 220 enables connection of the smart NIC 200 to the other physical components of a computer system (e.g., the bare metal CPU, memory, etc.) via the PCie bus of the computer system. Via this configurable PCie interface 220, the smart NIC 200 of some embodiments presents itself to the computer system as a multitude of devices, including a data message processing NIC, a hard disk (using non-volatile memory express (NVMe) over PCIe), a set of VFs and PFs, or other types of devices. The CPU 205 executes a NIC operating system (OS) in some embodiments that controls the ASICs 210 and can perform other operations as well. In some embodiments, a network forwarding and middlebox service offload ASIC 210 performs the operations to offload middlebox services, such as firewall services, from a host computer.

Figure 3:
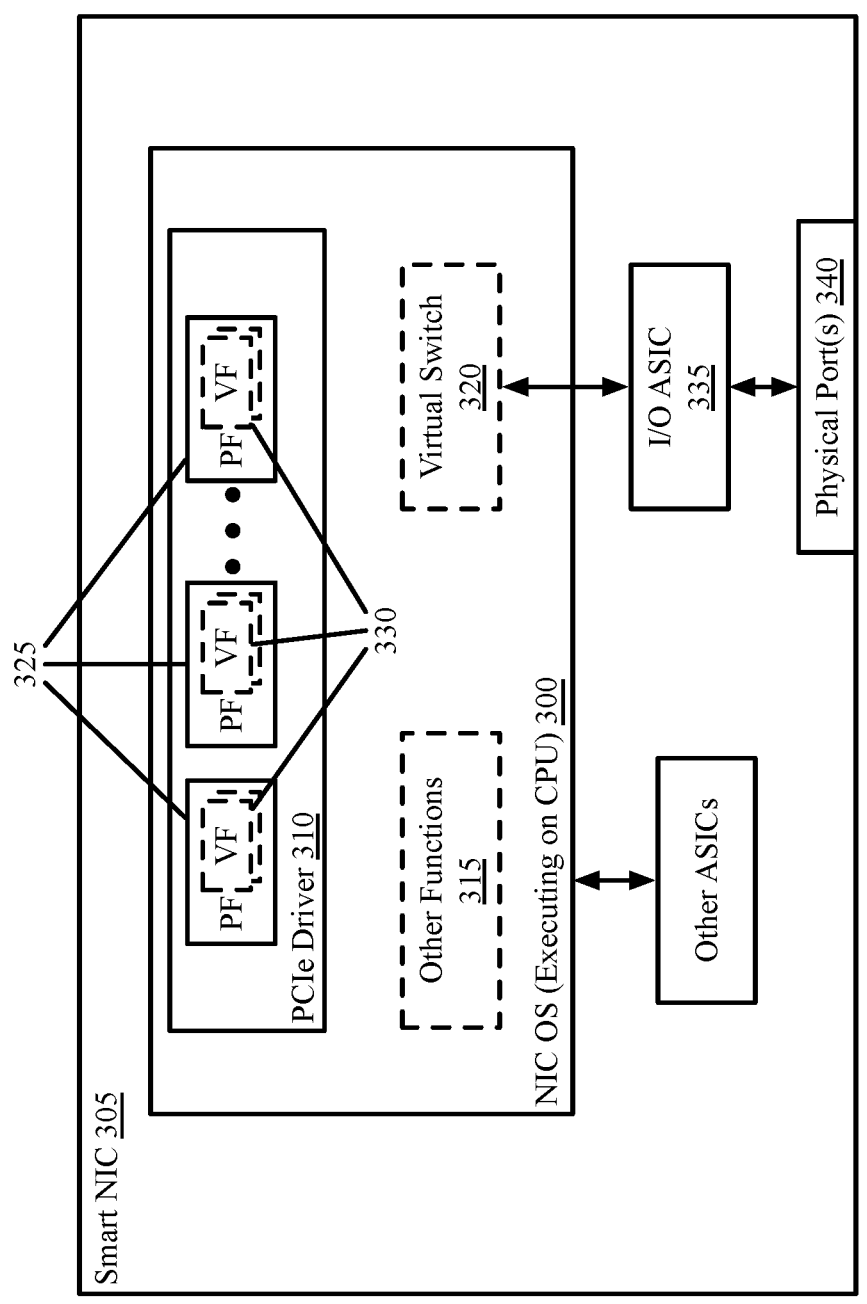
FIG. 3 illustrates the NIC OS of a smart NIC of some embodiments.

FIG. 3 illustrates an example NIC OS 300 of a smart NIC 305 of some embodiments. The NIC OS 300 is executed, in some embodiments, by the CPU of the smart NIC (e.g., CPU 205 of FIG. 2). This NIC OS 300 includes a PCIe driver 310, a virtual switch 320, and other functions 315.

The PCie driver 310 exposes multiple PFs 325, each of which capable of instantiating multiple VFs 330. These different VFs 330 enable the smart NIC 305 to present as multiple different types of devices to the computer system to which it attaches via its PCie bus. For instance, the smart NIC can present itself as a network adapter (for processing data messages to and from the computer system) as well as an NVMe disk in some embodiments.

The NIC OS 300 of some embodiments is capable of executing a virtualization program (similar to a hypervisor) that enables sharing resources (e.g., memory, CPU resources) of the smart NIC among multiple machines (e.g., VMs) if those VMs execute on the computer. The virtualization program in some embodiments provides compute virtualization services and/or network virtualization services similar to a managed hypervisor in some embodiments. These network virtualization services, in some embodiments, include segregating data messages into different private (e.g., overlay) networks that are defined over the physical network (shared between the private networks), forwarding the data messages for these private networks (e.g., performing switching and/or routing operations), and/or performing middlebox services for the private networks.

To implement these network virtualization services, the NIC OS 300 of some embodiments executes the virtual switch 320. The virtual switch 320 enables the smart NIC 305 to perform software-defined networking and provide the I/O ASIC 335 of the smart NIC 305 with a set of flow entries (e.g., the cache entries described herein) so that the I/O ASIC 335 can perform flow processing offload (FPO) for the computer system in some embodiments. The I/O ASIC 335, in some embodiments, receives data messages from the network and transmits data messages to the network via one or more physical network ports 340.

The other functions 315 executed by the NIC operating system 300 of some embodiments can include various other operations, including operations not directly related to data message processing (e.g., operations for a machine-learning system). In addition, the NIC operating system 300 (either the virtual switch 320 or other functions 315 of the operating system) in some embodiments performs various cache entry validation and invalidation operations and maintain a rule update table used to perform the cache entry validation.

As noted, the smart NIC of some embodiments processes data messages using cache entries (e.g., cache entries installed by a software forwarding element (SFE) executing on a computer for which the smart NIC is the interface) such that at least a subset of the data messages received at the smart NIC can be processed without a need to provide the data messages to the SFE. Data message processing by the smart NIC ASIC tends to be faster than processing by the SFE, even before accounting for the savings realized by avoiding the need to pass the data messages to and from the computer (e.g., via the PCIe interface).

FIG. 4 conceptually illustrates a process 400 of some embodiments for applying policies for a set of applications executing on a host computer of an SDN. The process 400 is performed by a set of management servers implementing a manager for the SDN. The host computer is a bare metal server executing the set of applications, and the bare metal server is incapable of applying the policies to data message flows itself. In some embodiments, each application is a legacy application (i.e., each application is not a virtualized application). The bare metal server is connected to a NIC, and the bare metal server in some embodiments views the NIC as a PCIe device, as the NIC is a PCIe device itself.

The process 400 begins by configuring (at 405) a network adapter on the NIC to create a logical port to connect an interface of the bare metal server to a VDS of the NIC. The manager in some embodiments directs (e.g., through a management interface on the NIC) a management agent executing on the NIC to configure the network adapter on the NIC. This network adapter allows for the logical port to be created on the NIC, which connects the bare metal server's interface to the VDS. The network adapter and logical port are in some embodiments installed and configured on the NIC's ARM cores.

SDN software is in some embodiments installed on top of the NIC's OS. Once this software is installed, then the logical port can be created (e.g., using a management plane workflow, which will be described in relation to FIG. 6) to plumb traffic between the PF and VF of the NIC to the VDS on the NIC.

In some embodiments, the logical port connects to the bare metal server's interface through an embedded switch of the NIC. The embedded switch is a hardware switch within the NIC. In such embodiments, the embedded switch connects to the logical port through a representor port. The embedded switch connects to the bare metal server's interface through a virtual function (VF) of a physical function (PF) of the NIC. In such embodiments, the PF is a physical interface of the NIC that includes a set of one or more VFs. Each VF in such embodiments is a virtualized PCIe function exposed as an interface of the NIC.

Next, the process 400 collects (at 410) configuration information regarding the logical port. The manager in some embodiments receives, from a set of controllers of the SDN, configuration information regarding the logical port. In such embodiments, the management agent on the NIC, after creating the logical port, provides this information to the set of controllers which provides it to the manager. The configuration information regarding the logical port can include a network address of the port. In some embodiments, the configuration information also includes PF and VF MAC addresses, and the logical switch and/or segment to which the logical port is being connected. In such embodiments, the manager has a set of policies for each logical switch and segment, which is sent down via the controller when a port connect is received.

At 415, the process 400 uses the configuration information for the logical port to define a set of policies based on the logical port. As the manager views the logical port as any other virtual port, the manager defines policies to be applied on the logical port. In such embodiments, the manager defined the set of policies for the logical port for the management agent on the NIC to translate them into policies defined with respect to a physical port of the VDS that maps to the logical port. The set of policies can include networking policies and/or security policies.

Lastly, the process 400 configures (at 420) the set of policies on the VDS for the VDS to apply to flows sent from applications on the bare metal servers to other host computers in the SDN. After defining the set of policies, the manager in some embodiments directs the management agent on the NIC to configure the set of policies on the VDS. As such, the VDS will apply the set of policies to flows sent to and from the set of applications on the bare metal server. The flows can be exchanged with applications on other bare metal servers and/or machines (e.g., VMs, containers, pods) executing on host computers. After configuring the set of policies in the VDS, the process 400 ends.

Figure 5:
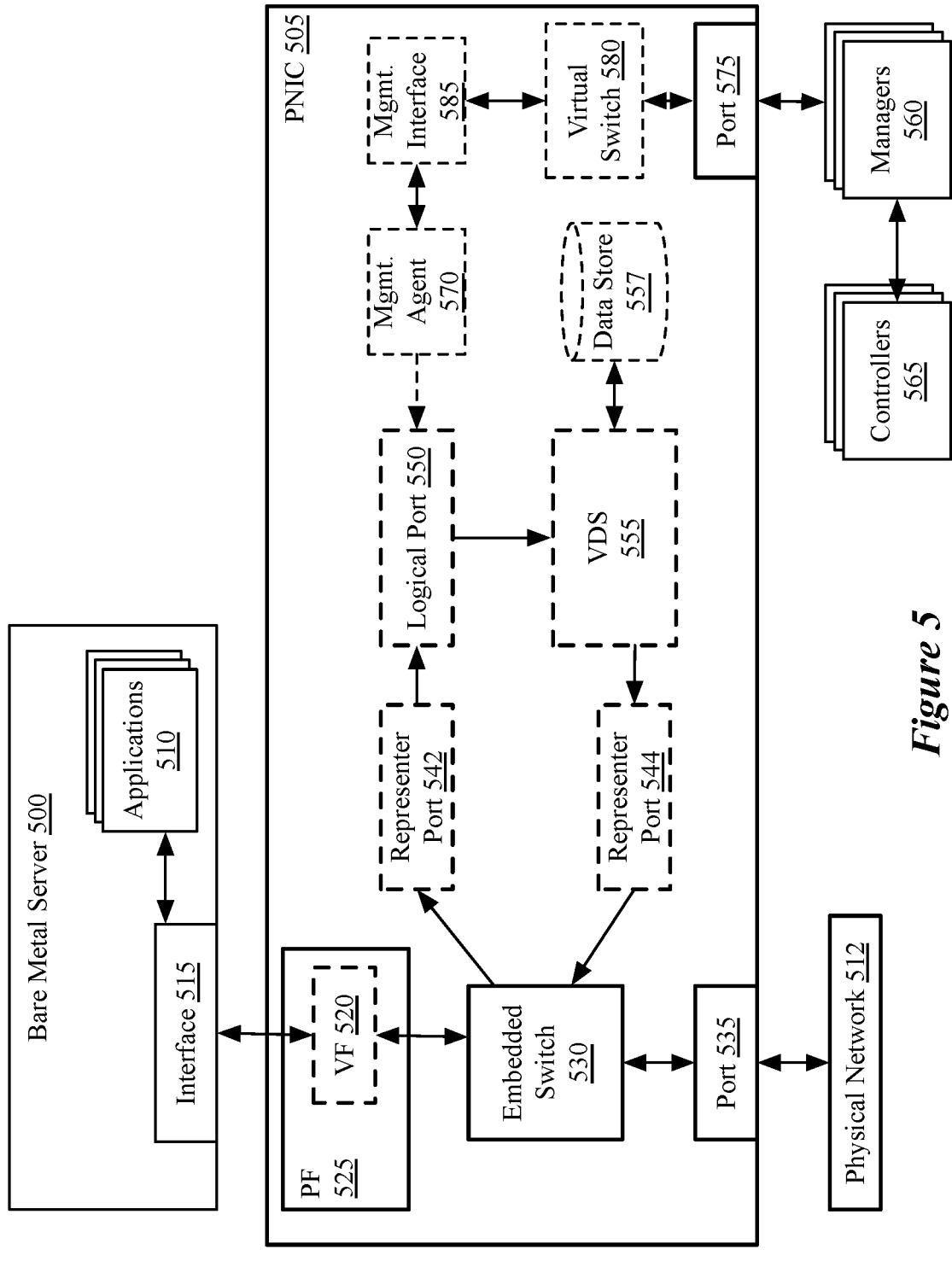
FIG. 5 illustrates an example bare metal server that connects to a PNIC.

FIG. 5 illustrates an example bare metal server 500 that connects to a PNIC 505. The PNIC 505 is in some embodiments a smart NIC. The bare metal server 500 executes a set of one or more applications 510 that sends and receives data message flows with a physical network 512. The bare metal server 500 can execute any number of applications 510, and each application can send and receive any number of flows with the physical network 512.

In this example, the bare metal server 500 includes an interface 515 to connect the applications 510 to the PNIC 505 (e.g., via a PCIe fabric (not shown) (such as a motherboard-level interconnect that connects the physical processor of the bare metal server 500 to the physical interfaces of the PNIC 505)). In such embodiments, each application 510 connects to the same interface 515 to connect to the same VF 520 of a PF 525 of the PNIC 505.

In other embodiments, the bare metal server 500 includes a different interface for each application 510. In such embodiments, each bare metal interface is bound to a different VF of the PNIC 505.

The VF 520, in some embodiments, is a virtualized PCIe function exposed as an interface of the PNIC 505. The VF 520 is associated with a PF 525, which is a physical interface of the PNIC that is recognized as a unique PCIe resource. The VF 520 is illustrated using dashed lines to indicate that it is a software component of the PNIC 505, and the PF 525 is illustrated using a solid line to indicate that it is a physical component of the PNIC 505. In this case, the PNIC 505 has one PF 525, but other embodiments the PNIC 505 has more than one PF. The PF 525 is virtualized to provide at least the VF 520. In some embodiments, multiple VFs are provided so as to provide different applications 510 with different virtual interfaces of the PNIC 505 to which they connect. In some embodiments, VF drivers (not shown) execute in each of the applications 510 to manage their respective connections to the VFs 520.

Alternatively or conjunctively, the applications 510 connect to the PNIC 505 using a software switch (not shown) of the bare metal server 500, which uses one or more interfaces (e.g., PF 525) exposed by the PNIC 505 as the uplink. In such embodiments, the PNIC 505 does not expose any VFs 520.

The VFs 520 connect to an embedded switch 530 of the PNIC 505. The embedded switch 530 is a hardware component of the PNIC 505 (as denoted by a solid line) that is configured to send and receive flows from the applications 510 and the physical network 512.

The embedded switch connects, through a first representor port 542 of the PNIC 505, to a logical port 550 of the PNIC 505. This logical port 550 allows for the bare metal server 500 to connect to the VDS 555 of the PNIC 505. In some embodiments, a set of managers 560 managing the bare metal server 500 (and along with other bare metal servers and/or host computers, in some embodiments) directs a management agent 570 of the PNIC 505 to create the logical port 550. In such embodiments, the managers 560 connect to a port 575 of the PNIC 505, which connects to a virtual switch 580 of the PNIC 505. The virtual switch 580 connects to a management interface 585 of the PNIC 505 which connects to the management agent 570.

When directed to by the managers 560, the management agent 570 configures a network adapter (not shown) on the PNIC 505 to create the logical port 550. The network adapter is referred to as bmknic in some embodiments, which is similar to a VMkernel network adapter called vmknic.

The management agent 570 in some embodiments performs a port attach operation, which creates the logical port 550. Then, the management agent 570 makes a connect system call, where a PF representor port within the VDS 555 will be created. After this, the logical port 550 appears as a traditional virtual port to the managers 560 and the controllers 565 of the bare metal server 500.

After this, the port connection of the logical port 550 is reported to the controllers 565, which pushes down the port properties like any other logical port. Then, the managers 560 can apply any networking and/or security policies on the logical port 550. More specifically, the managers 560 can define policies for the logical port 550, which the management agent 570 will translate into policies defined with respect to the physical port of the VDS 555 that maps to the logical port 550. As such, the policies can be applied in the data plane by the PNIC 505.

In embodiments where the bare metal server 500 includes multiple interfaces to connect to the PNIC 505, the managers 560 direct the management agent 570 to create multiple logical ports on the PNIC 505. In such embodiments, the managers 560 will direct the creation of as many logical ports as there are interfaces of the bare metal server 500 (i.e., there will be a one-to-one relationship between bare metal server interfaces and logical ports created on the PNIC 505).

In some embodiments, the embedded switch 530 is configured for allowing processing of the flows at the PNIC 505. In such embodiments, the embedded switch 530, upon receiving a data message of a flow, performs a lookup operation to determine whether it stores a flow record needed for processing the data message. In some embodiments, a single flow record is created for both directions of a flow (i.e., a first direction from an application 510 to an external component and a second direction from the external component to the application 510). In other embodiments, different flow records are created for different directions of a flow (i.e., two flow records are created for each flow). For example, different flow records are created for a single flow in some embodiments because the application 510 is allowed to send data messages to the external component, but the external component is blocked from sending data messages to the application 510.

If the embedded switch 530 determines that it does have an associated flow record, the embedded switch 530 processes the data message and forwards it to its destination (if the data message is allowed). If the destination is one of the applications 510, the embedded switch 530 forwards the processed data message to the VF 520 to forward to the destination application. If the destination is external to the bare metal server (e.g., it is an external server, a VM executing on a different host computer, etc.), it forwards the processed data message to a physical port 535 of the PNIC 505 to forward to the physical network 512 to reach its destination. The physical network port 535 provides the physical communication to the physical network 512 for the bare metal server 500. In some embodiments, the PNIC 505 includes multiple physical network ports to connect to the physical network 512.

If the embedded switch 530 determines that it does not have an associated flow record for a received data message, it provides the data message to the logical port 550 through a first representer port 542 of the PNIC 505. In some embodiments, the logical port 550 is created to connect the bare metal server 500 to the VDS 555 of the PNIC 505. The VDS 555 is in some embodiments a software switch of the PNIC 505, as denoted by a dashed line.

Upon receiving a data message from the embedded switch 530, the VDS 555 performs a lookup operation (similarly to the embedded hardware switch 530) in the data store 557 to determine whether it has already created a flow record for the data message's flow. If the VDS 555 determines that it does store a flow record for the received data message's flow in the data store 557, it processes the data message using the flow record and forwards the processed data message to the embedded switch 530 through a second representor port 544 of the PNIC 505 (if the data message is allowed). Then, the embedded hardware switch 530 forwards the processed data message to its destination.

If the VDS 555 determines that it has not yet created a flow record for the received data message's flow (e.g., if the data message is the first data message of the flow), the VDS 555 processes the data message according to a set of policies (e.g., networking and/or security policies). To process the data message using the set of policies, the VDS 555 in some embodiments compares the data message against the policies to match the data message to one or more policies. In such embodiments, the VDS 555 uses match criteria of the data message (e.g., the five-tuple of the data message and/or other contextual attributes of the data message) to match the data message to policies that should be applied to the data message. After identifying one or more policies that should be applied to the data message, the VDS 555 performs one or more operations to apply the policies.

In some embodiments, the VDS 555 performs one or more middlebox service operations on the data message. Examples of middlebox services include as a firewall service, NAT service, IDS service, or IPS service. Any suitable middlebox service that can be performed on a data message can be performed by the VDS 555.

The components 520-557 and 570-585 of the PNIC 505 in some embodiments run on top of a hypervisor (e.g., ESXio offered by VMware, Inc.) of the PNIC 505. The PNIC 505 in some embodiments also executes a virtual distributed router (VDR) (not shown) to perform routing for data messages. In such embodiments, the VDR executes along with the VDS to process the data messages.

After processing the data message, the VDS 555 creates a flow record for the data message's flow and stores it in the data store 557. In some embodiments, the flow record identifies the flow (e.g., using a flow identifier (ID) or using the flow's five-tuple) and summarizes the actions to perform on the data messages of the flow. The actions to perform on the flow can include one of allowing the flow, dropping the flow, or blocking the flow (i.e., a firewall action). In some embodiments, the actions also to perform on the flow include at least one middlebox service other than a firewall service (e.g., IDS, IPS, NAT, load balancing, DPI, etc.). The flow record allows the VDS 555 to process subsequent data messages of the flow without having to refer to the set of policies. This also allows the VDS 555 to offload processing of the flow to the embedded switch 530 by providing the flow record to the embedded switch 530. In some of these embodiments, the VDS 555 keeps track of which flows it has offloaded (e.g., using a table in the data store 557 or another data store (not shown) of the PNIC 505).

Figure 6A:
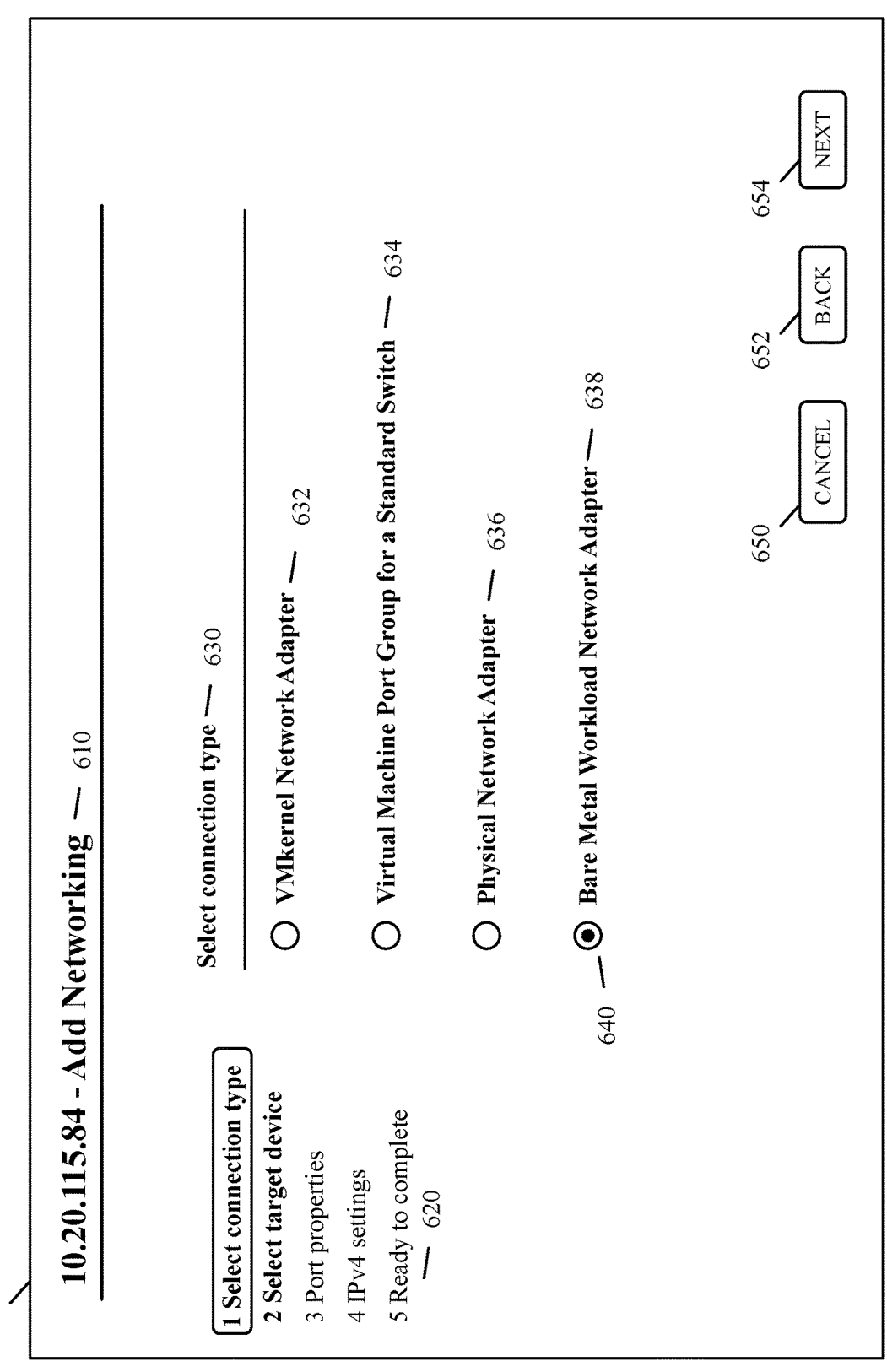
FIGS. 6A-B illustrate an example UI for a network administrator to configure a bare metal workload network adapter.
Figure 6B:
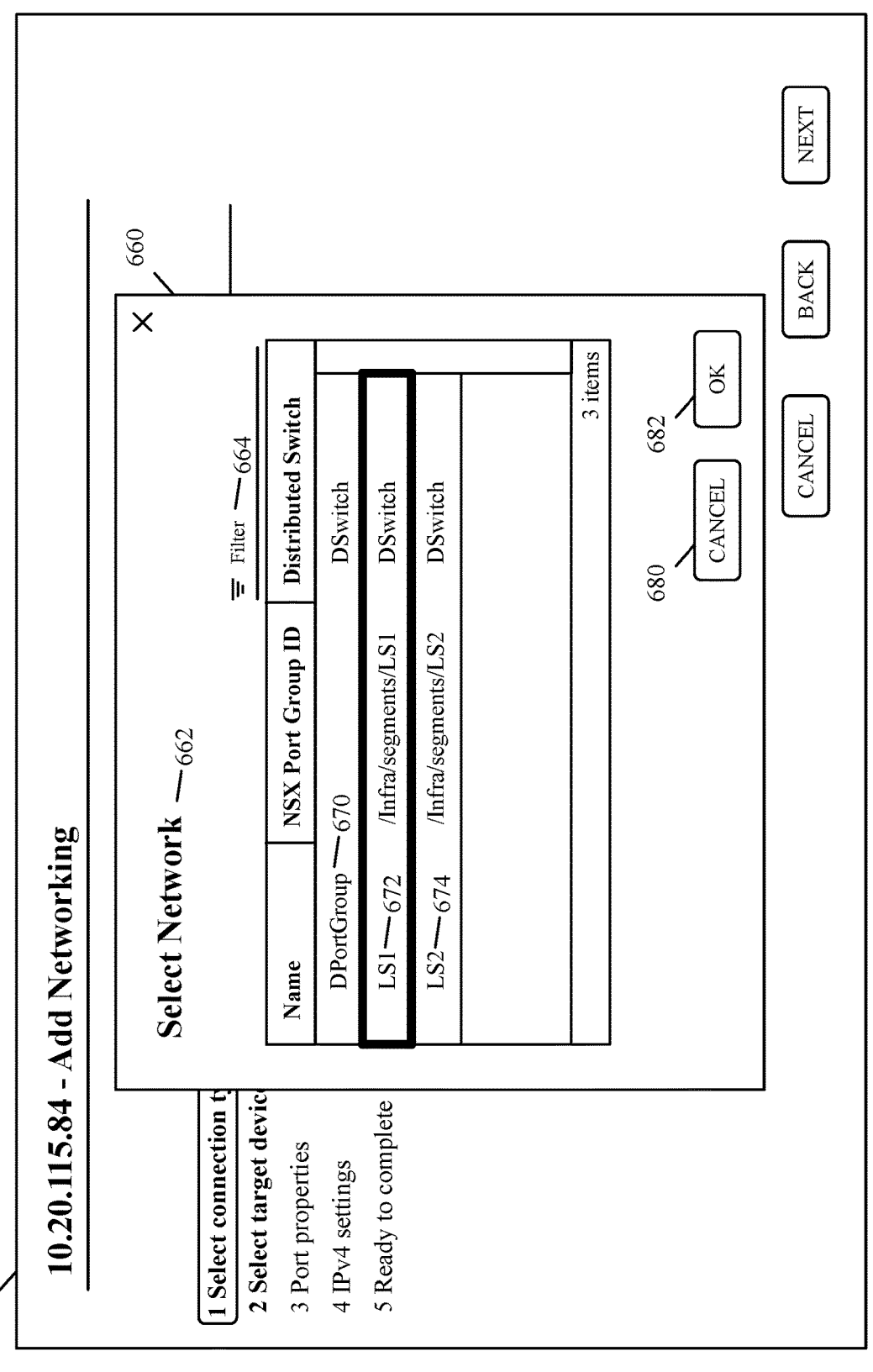

In some embodiments, the network administrator of the SDN that wishes to apply policies to a bare metal server (i.e., to a PNIC connected to the bare metal server) selects items in a user interface (UI) to configure a network adapter in order to apply those policies. FIGS. 6A-B illustrate an example UI 600 that is seen by a network administrator to configure a network adapter on a NIC connected to a bare metal server.

FIG. 6A illustrates the UI 600 when the network administrator is selecting to configure the bare metal workload network adapter. The UI 600 specifies, at 610, the network for which the network adapter will be configured. The UI 600 also specifies, at 620, various different settings for the network administrator to configure for the network. The settings 620 includes selecting a connection type, selecting a target device, port properties, IPv4 (Internet Protocol version 4) setting, and ready to complete. In this example, the network administrator is configuring the setting to select a connection type.

At 630, the UI 600 displays that the network administrator is selecting a connection type. In this example, the network administrator can select between four different connection types 632-638. The network administrator can select a VMKernel network adapter 632, which handles traffic for various services, such as machine migration, host management, network file systems (NFS), Fibre Channel over Ethernet (FcoE), virtual storage area network (vSAN), and other protocols (e.g., Transmission Control Protocol (TCP), such as iSCSI).

The network administrator can select a VM port group for a standard switch 634, which handles the VM traffic on a standard switch.

The network administrator can select a physical network adapter 636, which handles network traffic to other hosts in the network.

Lastly, in this example, the network administrator can select a bare metal workload network adapter 638, which handles networking and security for bare metal workloads. In this document, workloads refer to machines, which may be virtualized machines (e.g., machines, such as VMs, containers, or pods executing on host computers) or non-virtualized machines (e.g., machines or applications executing on bare metal servers). Any suitable technology may be used to provide a workload.

In this figure, the network administrator has selected the bare metal workload network adapter 638, which can be seen by the filled in selectable item 640. The network administrator can then select a "cancel" selectable item 650 to cancel their configuration of the network, a "back" selectable item 652 to go back to a previous UI, or a "next" selectable item 654 to go to the next UI.

FIG. 6B illustrates the UI 600 after the network administrator has selected the bare metal workload network adapter 638 and selected the "next" selectable item 654. In this figure, a popup window 660 is shown in the UI 600 for the network administrator to attach the bare metal workload network adapter to a network segment. The window 660 displays a title 662 to select a network, and a filter 664 to filter through a list of network segments displayed in the window 660.

In this example, the window 660 displays a distributed port group (DportGroup) 670, a first logical segment 672 (LS1), and a second logical segment 674 (LS2). The network administrator has selected the first logical segment 672, as denoted by a bolded line.

The window 660 also displays a "cancel" selectable item 680 for the network administrator to cancel applying the bare metal workload network adapter, and a "ok" selectable item 682 for the network administrator to finalize the configuration of the selected bare metal workload network adapter on the selected network segment (i.e., LS1 672).

Figure 7:
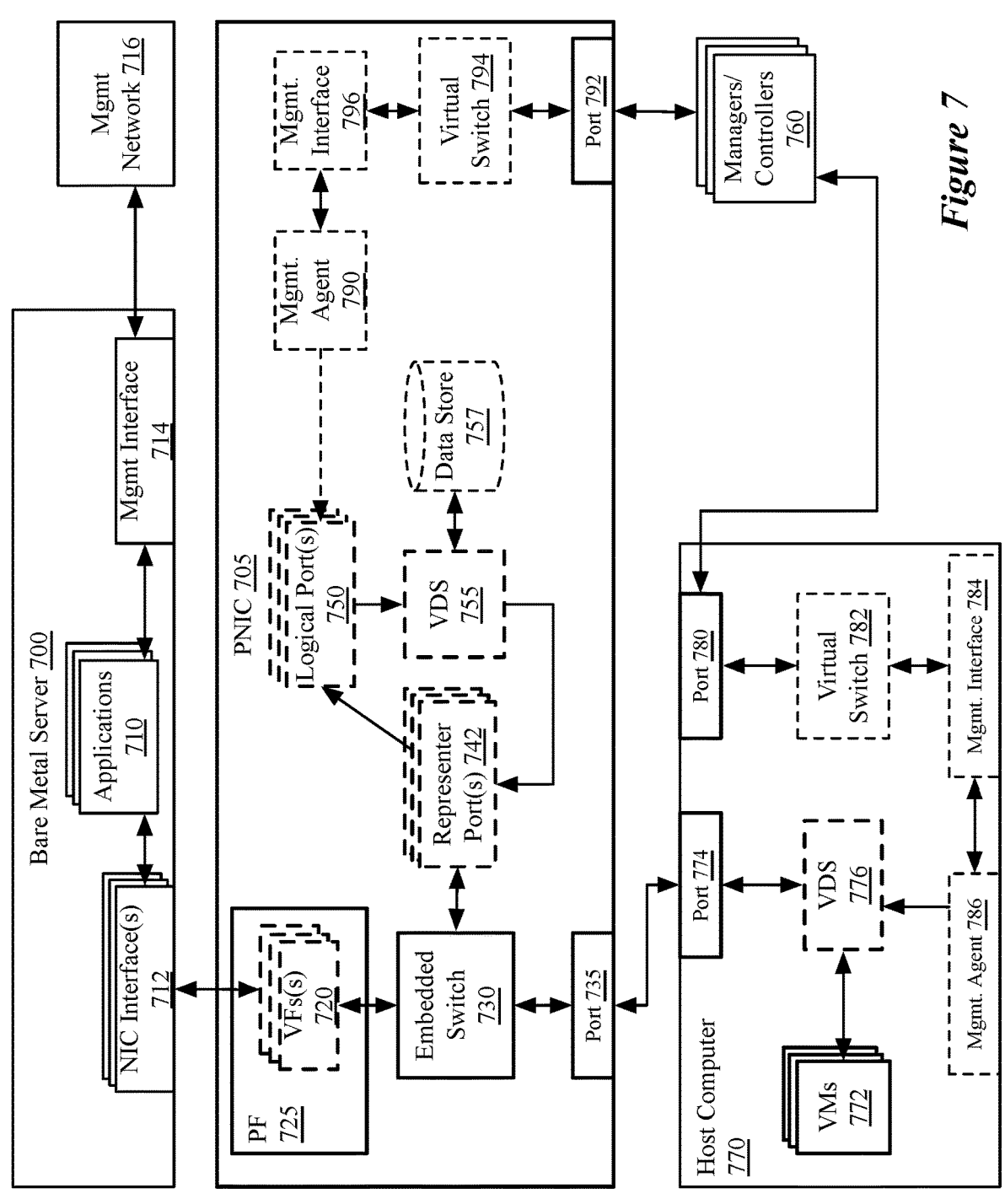
FIG. 7 illustrates an example bare metal server that exchanges data message flows with a host computer through a PNIC connected to the bare metal server.

FIG. 7 illustrates an example bare metal server 700 that connects to a PNIC 705. The PNIC 705 is in some embodiments a smart NIC. The bare metal server 700 executes a set of one or more applications 710 that sends and receives data message flows with a host computer 770. The bare metal server 700 can execute any number of applications 710, and each application can send and receive any number of flows with the host computer 770. The bare metal server 700 also includes a management interface 714, which connects the bare metal server 700 to a management network 716 to allow for management access to the bare metal server 700. In some embodiments, the components of the host computer 770 run on top of a hypervisor (e.g., ESX offered by VMware, Inc.) of the host computer 770, and the components of the PNIC 705 run on top of a hypervisor (e.g., ESXio offered by VMware, Inc.) of the PNIC 705.

In this example, the bare metal server 700 includes a set of one or more interfaces 712 to connect the applications 710 to the PNIC 705. In some of these embodiments, each application 710 connects to a different interface 712 to connect to a different VF 720 of a PF 725 of the PNIC 705. In some embodiments, VF drivers (not shown) execute in each of the applications 710 to manage their respective connections to the VFs 720.

Alternatively or conjunctively, the applications 710 connect to the PNIC 705 using a software switch (not shown) of the bare metal server 700, which uses one or more interfaces (e.g., PF 725) exposed by the PNIC 705 as the uplink. In such embodiments, the PNIC 705 does not expose any VFs 720.

The VFs 720 connect to an embedded switch 730 of the PNIC 705. The embedded switch 730 is a hardware component of the PNIC 705 (as denoted by a solid line) that is configured to send and receive flows from the applications 710 and the host computer 770.

The embedded switch 730 connects, through a set of one or more representor ports 742 of the PNIC 705, to a set of one or more logical ports 750 of the PNIC 705. This logical port set 750 allows for the bare metal server 700 to connect to the VDS 755 of the PNIC 705. The logical port set 750 is created by a management agent 790 of the PNIC 705 as directed to by the managers/controllers 760 that configure and manage the bare metal server 700 and the host computer 770. For example, through a port 792, a virtual switch 794, and a management interface 796, the managers and controllers 760 direct the management agent 790 to create the logical port set 750 and to configure networking and/or security policies on the logical port 750 (which will be applied by the VDS 755). The management agent 790 creates as many logical ports 750 as there are NIC interfaces 712 of the bare metal server 700.

The host computer 770 executes a set of one or more VMs 772. The host computer 770 also includes a first port 774 for connecting the host computer 770 to the PNIC 705, and a second port 780 for connecting the host computer 770 to the managers and controllers 760. The first port 774 connects to a VDS 776 of the host computer 770, which exchanges flows for the VMs 772. In some embodiments, the VDS 776 also performs one or more services (e.g., networking services, security services, middlebox services) on flows it exchanges for the VMs 772. The VDS 776 is part of the hypervisor (not shown) of the host computer 770.

The second port 780 connects to a virtual switch 782 of the host computer 770, which connects to a management interface 784 and a management agent 786. This port 780 allows for the managers and controllers 760 to direct the management agent 786 to apply policies to the VDS 776 to perform on flows associated with the VMs 772.

Because the managers and controllers 760 have created the logical port set 750 on the PNIC 705, the managers and controllers 760 can apply distributed networking and/or security policies to both the bare metal server 700 and the host computer 770. In some embodiments, a common UI is provided (e.g., through one or more web servers) to act as a single pane for the network administrator of the bare metal server 700 and host computer 770 in order for the network administrator to define and apply such policies.

Through the UI, the network administrator of some embodiments defines policies using one or more management plane requests, and the managers and controllers 760 convert the management plane requests into control plane configurations. Then, the managers and controllers 760 can produce configuration data for configuring the policies for the bare metal server 700 (through the PNIC 705) and for the host computer 770 (through the VDS 776, which executes as part of the hypervisor (not shown) of the host computer 770).

As the embedded switch 730 receives flows from the applications 710 destined for one or more of the VMs 772 of the host computer 770, the embedded switch 730 performs lookup operations to determine whether it has flow records to process the flows. If it does, the embedded switch 730 processes the flows. In processing the flows, the embedded switch 730 encapsulates the flows with an encapsulating header (e.g., a Geneve header) that specifies a source virtual tunnel endpoint (VTEP) and a destination VTEP. The source VTEP is associated with the port 735, and the destination VTEP is associated with the port 774. After encapsulating the flows with the source and destination VTEPs, the embedded switch 730 provides the encapsulated flows through the port 735 to reach the host computer 770. The port 735 of the PNIC 705 and the port 744 of the host computer 770 are connected by a link through a network (not shown) through which the encapsulate flows are sent.

The encapsulated flows are sent through a port 774 of the host computer 770 to reach a VDS 776 of the host computer 770. After receiving the encapsulated flows, the VDS 776 examines the encapsulating header to determine the source VTEP. Using this information, the VDS 776 can send responsive flows back to the same VTEP. In some embodiments, the VDS 776 also performs one or more operations (middlebox services) on the flows before providing them to the VMs 772.

When the VDS 776 receives flows to forward to the bare metal server 700, the VDS 776 encapsulates the flows with encapsulating headers specifying the source VTEP (associated with port 774) and the destination VTEP (associated with port 735), and provides the flows through the port 774 of the host computer 770 to reach the port 735 of the PNIC 705 (e.g., through a network). The embedded switch 730 receives the encapsulated flows through the port 735, removes the encapsulating header, and provides the flows to the applications 710 of the bare metal server 700 through the interface(s) 712.

Figure 8:
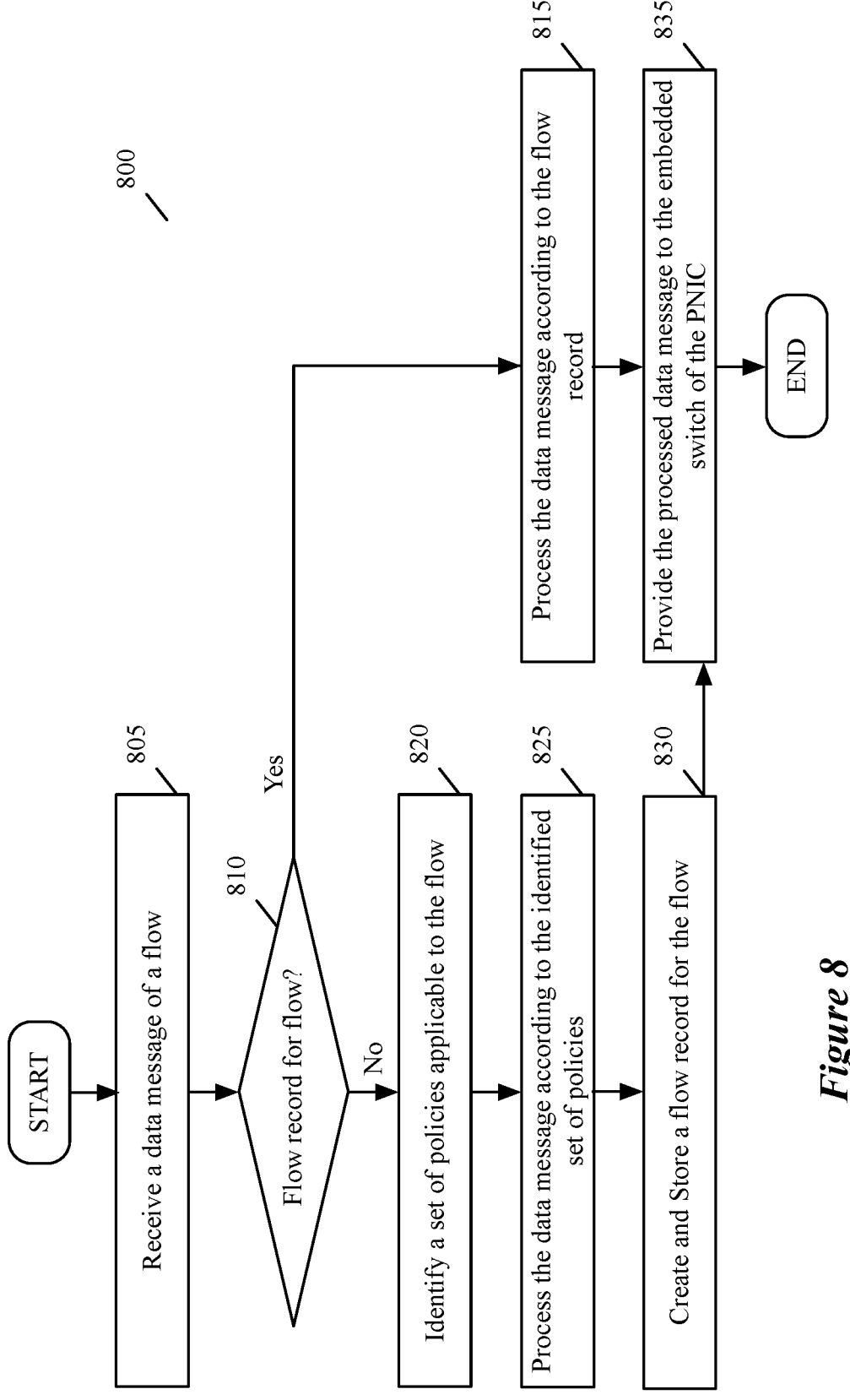
FIG. 8 conceptually illustrates a process of some embodiments for processing flows at a VDS of a PNIC.

As discussed previously, a VDS of a PNIC in some embodiments performs flow processing for flows exchanged between a bare metal server connected to the PNIC and other bare metal servers and/or host computers. FIG. 8 conceptually illustrates a process 800 of some embodiments for processing flows at a VDS of a PNIC. In some embodiments, the VDS that performs the process 800 connects to a bare metal server through a logical port created on the PNIC.

In some embodiments, the process 800 is performed for a particular data message flow that is sent by an application executing on the bare metal server to be forwarded to a destination external to the bare metal server, such as an external server or a machine (e.g., VM, container, pod) executing on a host computer. In other embodiments, it is sent by an external source to be forwarded to the application executing on the bare metal server.

The process 800 begins by receiving (at 805) a data message of the particular data message flow. In some embodiments, the VDS receives the data message from an embedded hardware switch of the PNIC, which received it from the application through a VF of a PF of the PNIC. The received data message is in some embodiments a first data message of the flow, such that the embedded hardware does not have a flow record needed for processing the data message. In other embodiments, the data message is not a first data message of the flow, but the embedded hardware switch was unable to process the data message. For example, the VDS in some embodiments does not provide a flow record for a flow to the embedded hardware switch for it to process the flow. This may be due to the embedded hardware switch being unable to perform one or more of the operations needed to process the flow (such as TCP synchronize (SYN) data messages and Application Layer Gateway (ALG) data messages).

After receiving the data message, the process 800 determines (at 810) whether a flow record is stored for the data message's flow. In some embodiments, the VDS creates and stores in a local data store a flow record for each flow it processes. A flow record in some embodiments specifies a flow ID (e.g., five-tuple, virtual local area network (VLAN) ID, virtual network identifier (VNI), globally unique identifier (GUID), universally unique identifier (UUID), etc.) identifying the flow and a set of one or more actions to perform on the data messages of the flow. In such embodiments, the VDS extracts the flow ID from the received data message and compares it to each flow record it stores.

If the process 800 determines that a flow record is stored for the received data message, the process 800 processes (at 815) the data message according to the flow record. In some embodiments, the flow record specifies a set of one or more actions to perform on the flow to process it. Examples of actions can include actions related to performing a middle-box service (e.g., firewall, load balancing, NAT, IDS, IPS, etc.) and encapsulating the data message with an encapsulating header (e.g., a Geneve header) specifying one or more VTEPs. After processing the data message according to the flow record, the process 800 proceeds to step 835 which will be described below.

If the process 800 determines that a flow record is not stored for the received data message, the process 800 identifies (at 820) a set of policies applicable to the flow. The VDS in some embodiments uses the flow ID and/or other contextual attributes related to the data message and/or the flow as match criteria to match the data message to a set of policies that is to be performed on the flow. The set of policies is identified from several policies the VDS stores for processing all flows associated with the bare metal server. The set of policies can include networking and/or security policies.

Then, the process 800 processes (at 825) the data message according to the identified set of policies. Because no flow record is stored for the data message's flow, the VDS uses the set of policies it identified to process the data message.

After processing the data message according to the set of policies, the process 800 creates (at 830) and stores a flow record for the flow. After the VDS determines which actions are to be performed on the flow (based on how the VDS processed the data message according to the set of policies), the VDS creates a flow record for the flow that specifies the flow's ID and the action or actions to perform on the flow. In some of these embodiments, the VDS continues to process these flows without offloading the processing of the flows to an embedded hardware switch of the PNIC.

In some embodiments, the VDS creates a single flow record for both directions of a flow. In other embodiments, the VDS creates different flow records for different directions of a flow (i.e., two flow records are created for each direction of a bidirectional flow).

In some embodiments, in addition to creating and storing the flow record, the VDS also provides the flow record to the embedded switch of the PNIC. In doing so, the VDS offloads the processing of this particular flow from itself to the embedded switch, as the embedded switch can use the flow record to process subsequent data messages of the flow.

In embodiments where the VDS creates two flow records for a single connection (i.e., a flow record for each direction of the connection), the VDS provides both flow records to the embedded switch. In other embodiments, the VDS provides only one of the flow records to the VDS, meaning that the processing of one direction of the flow will be offloaded, but not the other. The VDS does this in some embodiments to continue processing one direction of the flow.

At 835, the process 800 provides the processed data message to the embedded switch of the PNIC. The VDS provides the processed data message through a representor port to the embedded switch for the embedded switch to forward the data message to its destination. After providing the processed data message to the embedded switch, the process 800 ends.

Figure 9:
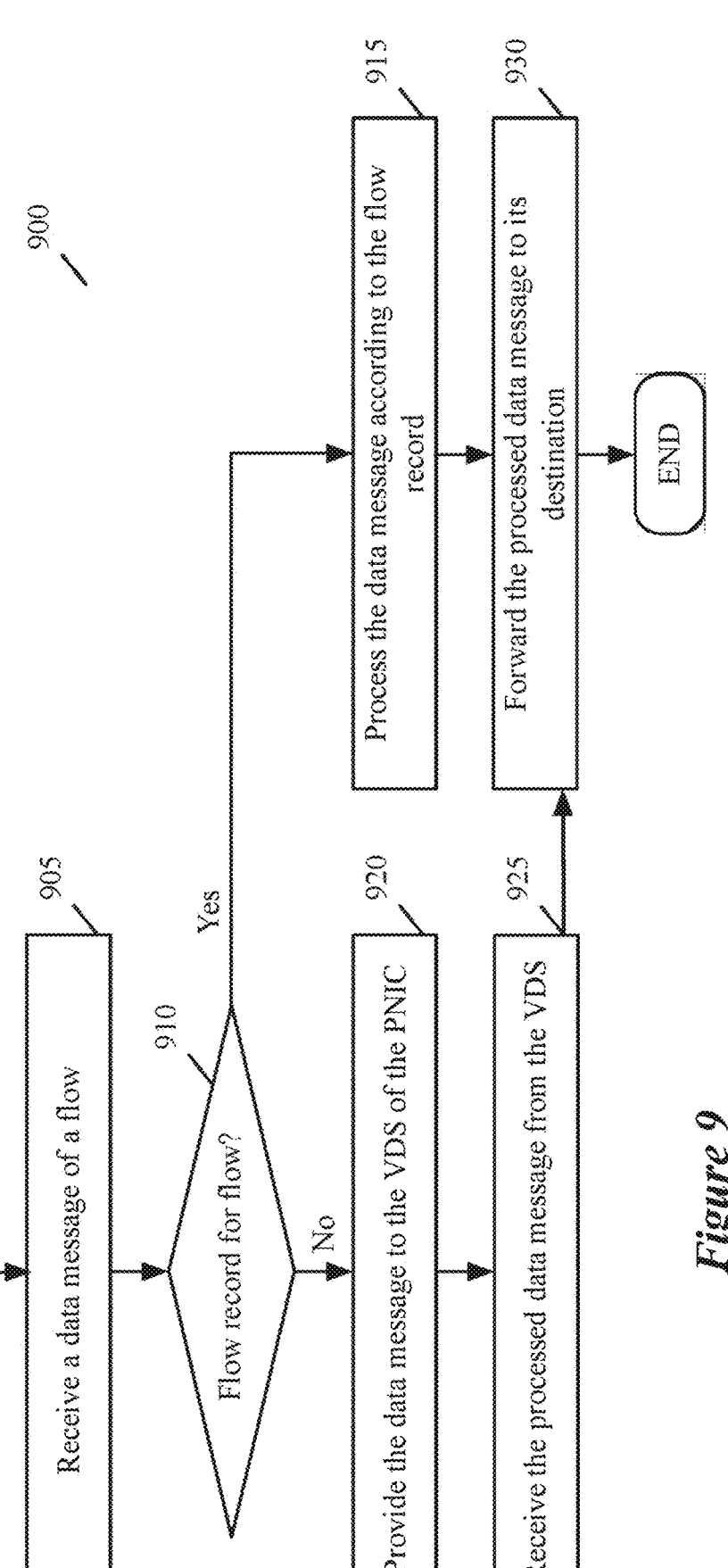
FIG. 9 conceptually illustrates a process of some embodiments for processing flows at an embedded switch of a PNIC.

FIG. 9 conceptually illustrates a process 900 of some embodiments for processing flows at an embedded switch of a PNIC. In some embodiments, the embedded switch that performs the process 900 connects to a bare metal server through a VF of a PF of the PNIC and an interface of the bare metal server.

In some embodiments, the process 900 is performed for a particular data message flow that is sent by an application executing on the bare metal server to be forwarded to a destination external to the bare metal server, such as an external server or a machine (e.g., VM, container, pod) executing on a host computer. In other embodiments, it is sent by an external source to be forwarded to the application executing on the bare metal server.

The process 900 begins by receiving (at 905) a data message of a particular flow. In some embodiments, the embedded switch receives the data message from the application executing on the bare metal server to forward it to an external destination (e.g., another application executing on another bare metal server, a machine executing on a host computer, an external server, etc.). In such embodiments, the embedded switch receives the data message from the application through a VF on the PNIC. In other embodiments, the embedded switch receives the data message from an external source to be forwarded to the application on the bare metal server. In such embodiments, the embedded switch receives the data message through a physical network port of the PNIC.

Next, the process 900 determines (at 910) it has a flow record stored for the flow. The embedded switch in some embodiments determines this by performing a lookup operation to find a flow record associated with the flow. The embedded switch in some embodiments receives flow records from the VDS of the PNIC so the VDS can offload processing of one or more flows from itself to the embedded switch. In such embodiments, the embedded switch stores the flow records in a local data store to process flows. A flow record in some embodiments specifies a flow ID (e.g., five-tuple, VLAN ID, VNI, GUID, UUID, etc.) identifying the flow and a set of one or more actions to perform on the data messages of the flow. In such embodiments, the embedded switch extracts the flow ID from the received data message and compares it to each flow record it stores in order to find a matching flow record.

If the process 900 determines that a flow record is stored for the flow, the process 900 processes (at 915) the data message according to the associated flow record. In some embodiments, the embedded switch performs on the data message the action or actions specified in the flow record to process it. For instance, the flow record in some embodiments specifies that the flow is to be allowed (based on a firewall rule that is to be applied to this flow), so the embedded switch allows the flow. Conjunctively or alternatively, the flow record specifies one or more VTEPs that are to be specified in an encapsulating header of the flow. In such embodiments, the embedded switch inserts in an encapsulating header of the data message one or more VTEPs (e.g., a source VTEP and/or a destination VTEP). After processing the data message according to the flow record, the process 900 proceeds to step 930, which will be described below.

If the process 900 determines that the there is no flow record stored for the flow, the process 900 provides (at 920) the data message to the VDS of the PNIC for processing. Because the embedded switch does not have a flow record for the data message's flow, it does not know which action or actions need to be performed on the data message in order to process it. As such, the embedded switch provides the data message to the PNIC's VDS so it can be processed.

The embedded switch provides the data message to the VDS through a representor port and a logical port of the PNIC. The logical port was created on the PNIC to connect the bare metal server to the VDS. The logical port maps to a physical port of the VDS.

After providing the data message to the VDS, the process 900 receives (at 925) the processed data message from the VDS. In some embodiments, the VDS processes the data message and provides the processed data message to the embedded switch through a representer port of the PNIC. This representor port may be the same representor port that the embedded switch used to provide the data message to the VDS, or may be a different representor port of the PNIC.

At 930, the process 900 forwards the processed data message to its destination (e.g., a machine executing on a host computer, another application executing on another bare metal server, an external destination, etc.). The embedded switch in some embodiments forwards the processed data message through a physical network port of the PNIC to reach its destination. After forwarding the processed data message, the process 900 ends.

Figure 10A:
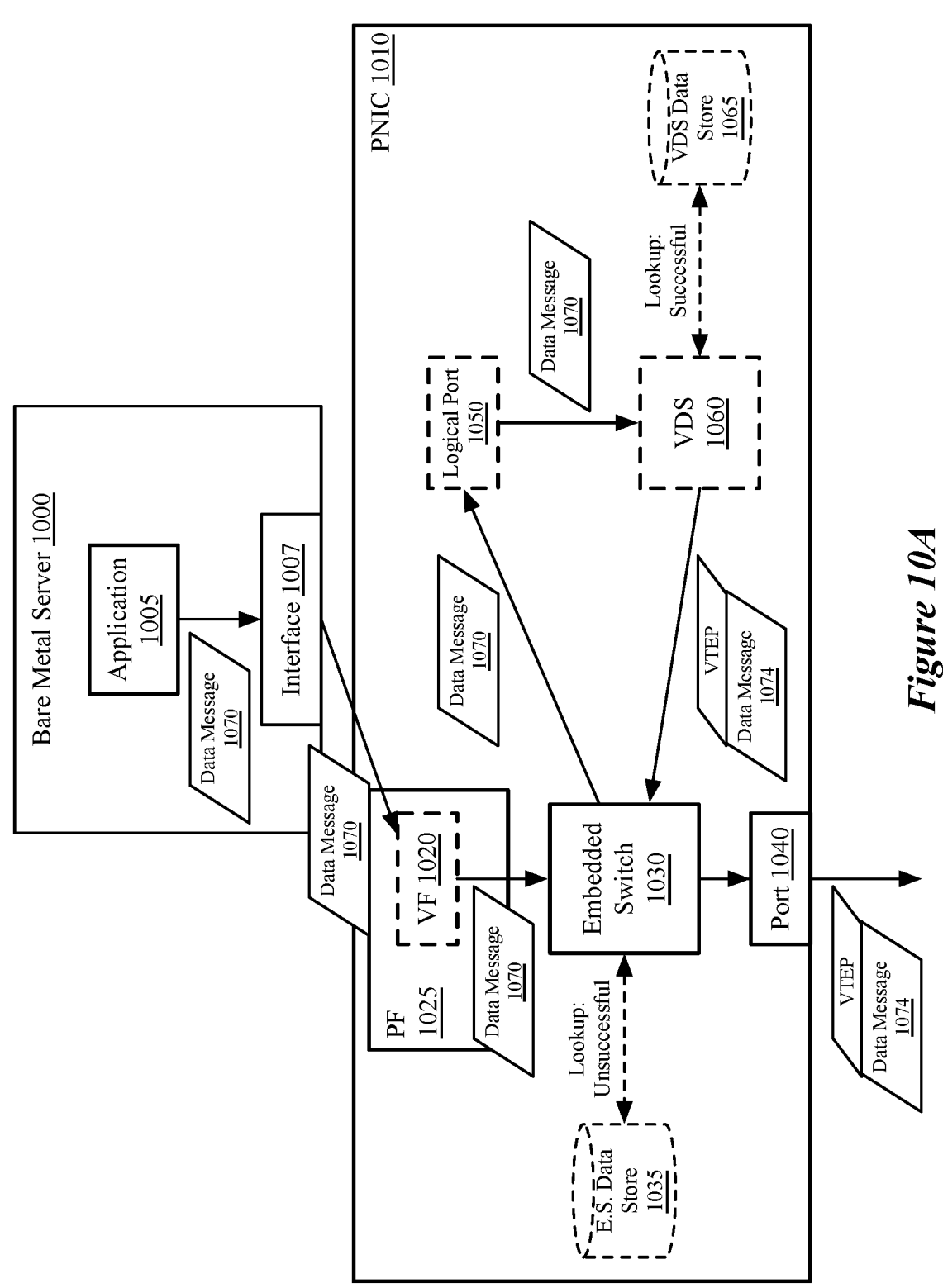
FIGS. 10A-B illustrate an example bare metal server executing an application that forwards data message flows through a connected PNIC to one or more external destinations.
Figure 10B:
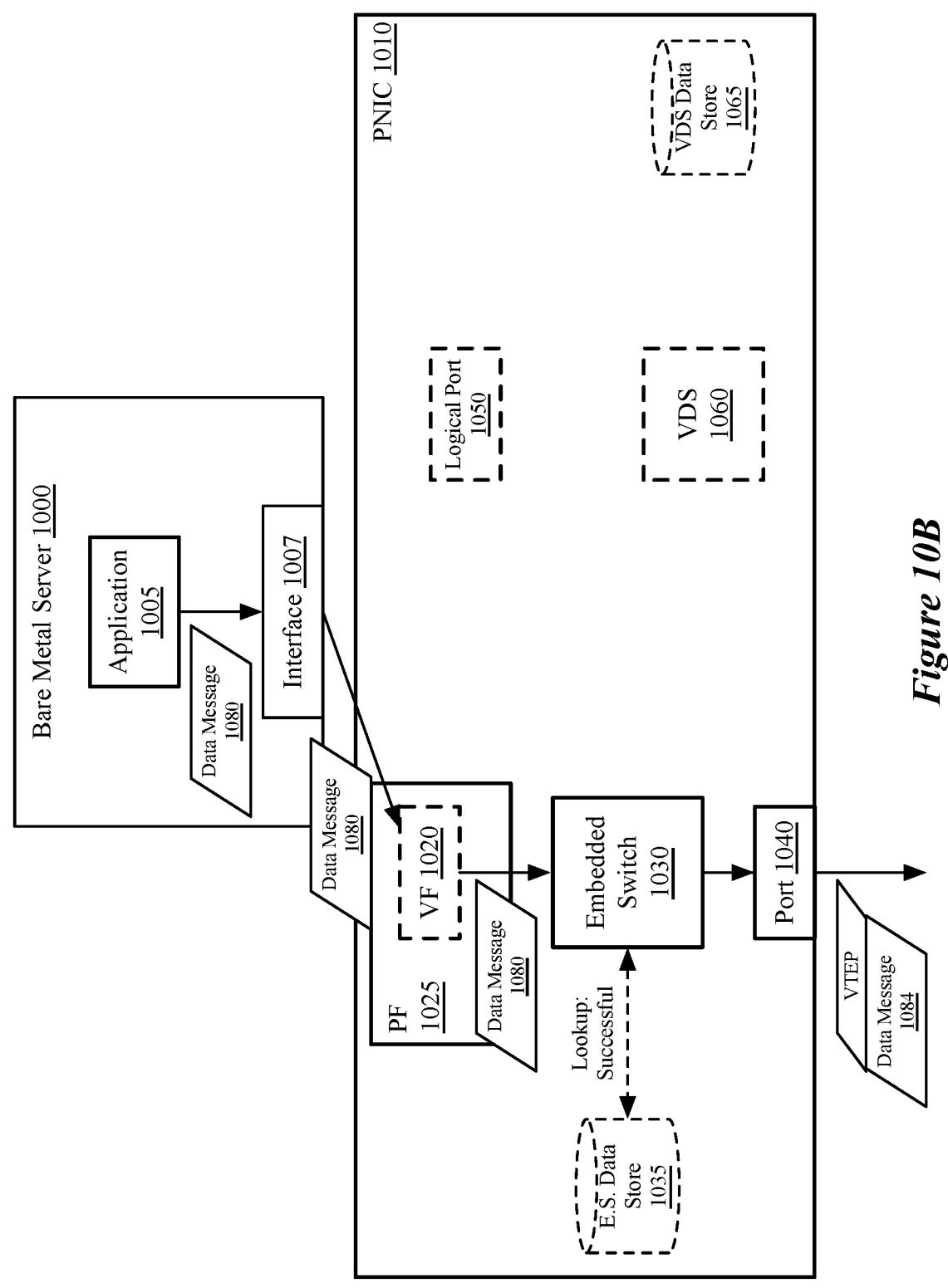

FIGS. 10A-B illustrate an example bare metal server 1000 executing an application 1005 that forwards data message flows through a connected PNIC 1010 to one or more external destinations. The external destinations can include another application executing on another bare metal server, a machine (e.g., VM, container, pod) executing on a host computer, or any other suitable destination for a flow sent from a bare metal server application. The bare metal server 1000 can execute any number of applications, including the application 1005, that can send data message flows through the PNIC to external destinations.

The bare metal server 1000 also includes an interface 1007 to connect the application 1005 to the PNIC 1010. In some embodiments, the bare metal server 1000 includes only one interface to connect to the PNIC 1010. In other embodiments, the bare metal server 1000 includes a set of interfaces (e.g., one interface per application executing on the bare metal server 1000) to connect to the PNIC 1010.

The bare metal server's interface 1007 connects to a VF 1020 of a PF 1025 of the PNIC 1010. Through the interface 1007 and the VF 1020, the application 1005 sends flows to the embedded switch 1030 of the PNIC 1010. The embedded switch 1030 is associated with a data store 1035 that stores flow records for the embedded switch 1030 to use to process flows. The embedded switch 1030 also connects to a port 1040.

The embedded switch 1030 connects to a logical port 1050 (e.g., through a representor port) of the PNIC 1010, which connects to a VDS 1060 of the PNIC 1010. The logical port 1050 is created on the PNIC 1010 to provide connection between the bare metal server 1000 and the VDS 1060. The VDS 1060 executes on the PNIC 1010 to perform flow processing for the bare metal server 1000. The VDS 1060 is associated with its own data store 1065 to store policies it receives (e.g., from a manager) to apply to flows and to store flow records it creates for flows. In this example, the VDS 1060 is associated with one data store 1065 to store policies and flow records. In other embodiments, the VDS 1060 has separate data stores to store the policies and flow records. The embedded switch 1030, embedded switch data store 1035, port 1040, logical port 1050, VDS 1060, and VDS data store 1065 in some embodiments run on top of a hypervisor (e.g., ESXio offered by VMware, Inc.) of the PNIC 1010.

FIG. 10A illustrates the application sending a data message 1070 through the interface 1007 to the VF 1020. The embedded switch 1030 receives the data message 1070 from the VF 1020. After receiving the data message 1070, the embedded switch 1030 performs a lookup operation in its data store 1035 to determine whether it stores a flow record matching the data message 1070. The embedded switch 1030 performs this lookup operation using a flow ID (e.g., five-tuple, UUID, VLAN ID, VNI, etc.) specified in the data message 1070. In this example, the lookup operation is unsuccessful, meaning that the embedded switch data store 1035 does not have a flow record matching the data message 1070.

After determining that it does not store a flow record for the data message 1070, the embedded switch 1030 provides the data message 1070 to the logical port 1050, which is then received at the VDS 1060. Then, the VDS 1060 performs its own lookup operation in its data store 1065 to determine whether it stores a flow record for the data message's flow. If the lookup operation is successful, the VDS 1060 retrieves the flow record from the data store 1065 and processes the data message 1070 according to the flow record.

If the lookup operation is unsuccessful, the VDS 1060 performs another lookup operation in the data store 1065 to identify a set of policies that are applicable to the data message 1070. This lookup operation may be performed by matching match criteria (e.g., the flow ID) to different policies. After identifying the set of policies that are to be applied to the data message, the VDS 1060 processes the data message 1070 using the identified set of policies.

In this example, in processing the data message 1070, the VDS 1060 encapsulates the data message 1070 with an encapsulating header that specifies one or more VTEPs (e.g., source VTEP and/or destination VTEP). Then, the VDS 1060 provides the encapsulated data message 1074 to the embedded switch 1030 (e.g., through a representor port). Upon receiving the encapsulated data message 1074, the embedded switch 1030 forwards it through the port 1040 to its destination.

In some embodiments, after processing the data message 1070, the VDS 1060 creates a flow record for its flow, stores the flow record in the data store 1065, and provides the flow record to the embedded switch 1030. Upon receiving the flow record, the embedded switch 1030 stores it in its data store 1035 so it can process subsequent data messages of the flow without the VDS 1060 seeing any of these subsequent data messages.

FIG. 10B illustrates the application sending a data message 1080 through the interface 1007 to the VF 1020. The embedded switch 1030 receives the data message 1080 from the VF 1020. After receiving the data message 1080, the embedded switch 1030 performs a lookup operation in its data store 1035 to determine whether it stores a flow record matching the data message 1080. The embedded switch 1030 performs this lookup operation using a flow ID (e.g., five-tuple, UUID, VLAN ID, VNI, etc.) specified in the data message 1080. In this example, the lookup operation is successful, meaning that the embedded switch data store 1035 does have a flow record matching the data message 1080. Because of this, the embedded switch 1030 can process the data message 1080 and the VDS 1060 does not have to receive or process it at all.

In this example, in processing the data message 1080, the embedded switch 1030 encapsulates the data message 1080 with an encapsulating header that specifies one or more VTEPs (e.g., source VTEP and/or destination VTEP). Then, the embedded switch 1030 forwards the encapsulated data message 1084 through the port 1040 to its destination.

By connecting PNICs to bare metal servers and using network adapters to create logical ports on the PNICs, a manager of an SDN including the bare metal servers can apply networking and/or security policies to both the bare metal servers and other host computers executing virtualized machines. Since the bare metal servers execute legacy applications (i.e., non-virtualized applications), the manager cannot directly apply the policies on the bare metal servers. There have been other attempts to solve this issue, however the other attempts bring up other issues.

Figure 11:
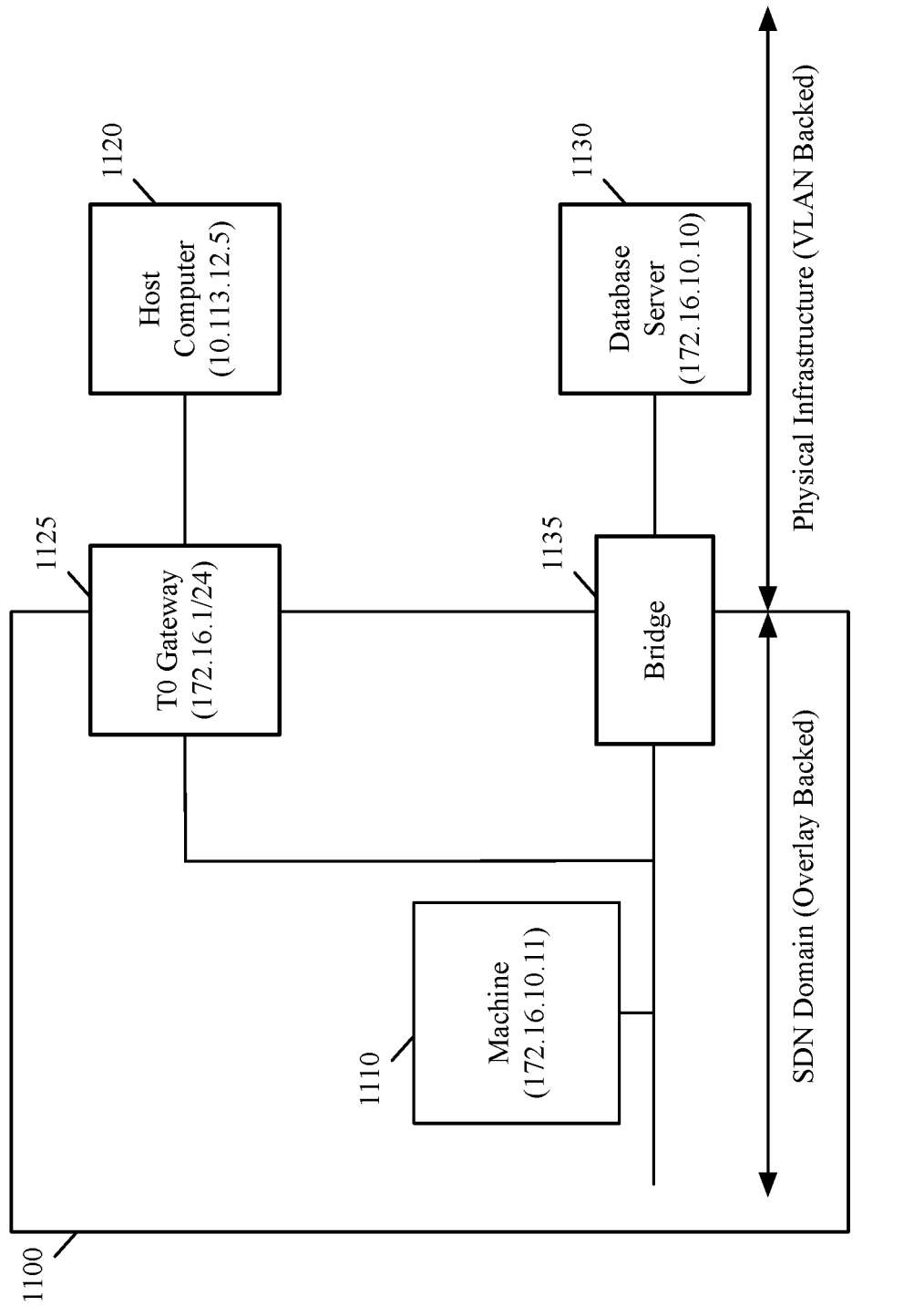
FIG. 11 illustrates two methods that provide VLAN-overlay communication but cause other issues.

FIG. 11 illustrates two methods to provide VLAN-overlay communication. In this figure, a machine 1110 of an overlay backed SDN domain 1100 is to communicate with a host computer 1120 and a database server 1130 in a VLAN backed physical infrastructure. The machine's IP address is 172.16.10.11, the host computer's IP address is 10.113.12.5, and the database server's IP address is 172.16.10.10.

To connect to the host computer 1120, some embodiments deploy a T0 (Tier-0) gateway 1125 (with IP address 172.16.1/24) for routing flows between the machine 1110 and the host computer 1120. To connect to the database server 1130, some embodiments deploy a VLAN overlay bridge 1135 so that security policies (e.g., firewall policies) can be applied to traffic between the machine 1110 and the database server 1130. However, both the TO gateway 1125 and the bridge 1135 can lead to a performance bottleneck.

Conjunctively or alternatively, some embodiments get bare metal workloads (e.g., bare metal applications) to work with virtualized infrastructure by integrating multiple SDN solutions from different vendors. However, this suffers complexity in providing uniform policies across an entire set of bare metal servers and host computers. It also leads to integration challenges as it has to deal with different configurations on multiple orchestrators (e.g., network controllers).

Connecting NICs to bare metal servers and applying networking and/or security policies on the NICs allows for a manager of an SDN to facilitate these policies for both bare metal servers and for virtualized workloads (e.g., VMs) of host computers in a distributed manner. This avoids performance issues (e.g., bottlenecks) and integration/configuration issues.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
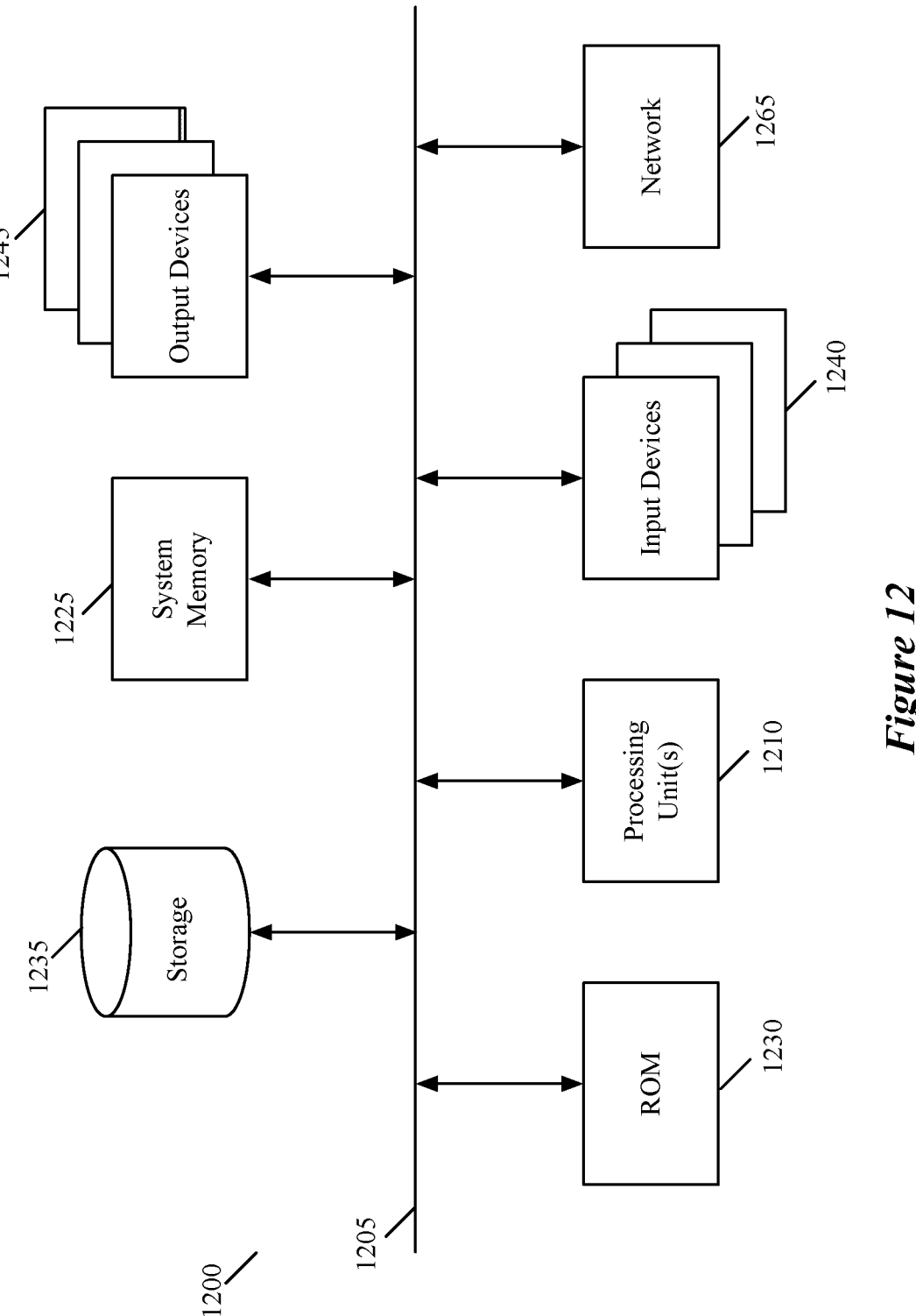
FIG. 12 illustrates an electronic system with which some embodiments of the invention are implemented.

FIG. 12 conceptually illustrates a computer system 1200 with which some embodiments of the invention are implemented. The computer system 1200 can be used to implement any of the above-described computers and servers. As such, it can be used to execute any of the above described processes. This computer system includes various types of non-transitory machine readable media and interfaces for various other types of machine readable media. Computer system 1200 includes a bus 1205, processing unit(s) 1210, a system memory 1225, a read-only memory 1230, a permanent storage device 1235, input devices 1240, and output devices 1245.

The bus 1205 collectively represents all system, peripheral, and chipset buses that communicatively connect the numerous internal devices of the computer system 1200. For instance, the bus 1205 communicatively connects the processing unit(s) 1210 with the read-only memory 1230, the system memory 1225, and the permanent storage device 1235.

From these various memory units, the processing unit(s) 1210 retrieve instructions to execute and data to process in order to execute the processes of the invention. The processing unit(s) may be a single processor or a multi-core processor in different embodiments. The read-only-memory (ROM) 1230 stores static data and instructions that are needed by the processing unit(s) 1210 and other modules of the computer system. The permanent storage device 1235, on the other hand, is a read-and-write memory device. This device is a non-volatile memory unit that stores instructions and data even when the computer system 1200 is off. Some embodiments of the invention use a mass-storage device (such as a magnetic or optical disk and its corresponding disk drive) as the permanent storage device 1235.

Other embodiments use a removable storage device (such as a flash drive, etc.) as the permanent storage device. Like the permanent storage device 1235, the system memory 1225 is a read-and-write memory device. However, unlike storage device 1235, the system memory is a volatile read-and-write memory, such a random access memory. The system memory stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieve instructions to execute and data to process in order to execute the processes of some embodiments.

The bus 1205 also connects to the input and output devices 1240 and 1245. The input devices enable the user to communicate information and select commands to the computer system. The input devices 1240 include alphanumeric keyboards and pointing devices (also called "cursor control devices"). The output devices 1245 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 12, bus 1205 also couples computer system 1200 to a network 1265 through a network adapter (not shown). In this manner, the computer can be a part of a network of computers (such as a local area network ("LAN"), a wide area network ("WAN"), or an Intranet, or a network of networks, such as the Internet. Any or all components of computer system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method for defining a set of policies for a set of applications executing on a computer of a software-defined network (SDN), the method comprising:
configuring, on a physical network interface card (PNIC) connected to the computer, a network adapter to create a logical port that is mapped by the PNIC to a physical port of a virtual distributed switch (VDS) executing on the PNIC, wherein the logical port connects an interface of the computer to the VDS, and instructions to execute the VDS are stored on the PNIC; and
defining the set of policies for the logical port to cause the VDS to apply the set of policies to data message flows sent by the PNIC via the logical port, from the set of applications on the computer to one or more other computers of the SDN.

2. The method of claim 1, wherein the computer is a bare metal server that is incapable of applying the set of policies to the data message flows.

3. The method of claim 1, wherein the set of policies comprises at least one of networking policies and security policies, to apply to the data message flows.

4. The method of claim 1, further comprising:
before defining the set of policies, receiving configuration information regarding the logical port, which is used to define the set of policies.

5. The method of claim 4, wherein the configuration information regarding the logical port is received from one or more controllers of the SDN and specifies a network address of the logical port.

6. The method of claim 1, wherein the computer views the PNIC as a Peripheral Component Interconnect Express (PCIe) device connected to the computer.

7. The method of claim 1, wherein the logical port connects to the interface of the computer through an embedded switch of the PNIC that forwards packets between the interface of the computer and the VDS.

8. The method of claim 7, wherein the embedded switch connects to the interface of the computer through a virtual function (VF) of a physical function (PF) of the PNIC.

9. The method of claim 8, wherein the VF is a virtualized peripheral component interconnect express (PCIe) function exposed as an interface of the PNIC, and the PF is a physical interface of the PNIC.

10. The method of claim 8, wherein the logical port connects to the embedded switch through a representor port of the PNIC.

11. The method of claim 7, wherein the embedded switch is a hardware switch.

12. The method of claim 7, wherein the embedded switch is configured to:

receive a particular data message of a particular data message flow from a particular application;

determine that the embedded switch does not store a flow record for the particular data message flow; and provide the particular data message to the VDS through the logical port.

13. The method of claim 12, wherein the VDS is configured to:

based on the set of policies, perform one or more operations on the particular data message including a particular operation to encapsulate the particular data message with an encapsulating header specifying at least one of a source virtual tunnel endpoint (VTEP) and a destination VTEP.

14. The method of claim 13, wherein the encapsulating header is a Generic Network Virtualization Encapsulation (Geneve) header.

15. The method of claim 13, wherein the VDS is further configured to:

provide the encapsulated particular data message to the embedded switch, and wherein the embedded switch is further configured to:

forward the encapsulated particular data message to a destination of the particular data message.

16. The method of claim 13, wherein the one or more operations further comprise one or more middlebox service operations.

17. The method of claim 16, wherein the one or more middlebox service operations comprise one or more of firewall services, load balancing services, network address translation services, intrusion detection services, and intrusion prevention services.

18. The method of claim 13, wherein the VDS is further configured to:

determine a set of actions to perform on the particular data message flow based on the one or more operations performed on the particular data message;

generate a particular flow record for the particular data message flow specifying a flow identifier and the set of actions; and provide the particular flow record to the embedded switch, and wherein the embedded switch is further configured to:

use the particular flow record to perform the set of actions on subsequent data messages of the particular data message flow.

19. The method of claim 1, wherein the configuring and defining steps are performed by one or more management servers of the SDN connecting to the PNIC through a management interface of the PNIC.

20. A non-transitory machine readable medium storing a program for execution by at least one processing unit for defining a set of policies for a set of applications executing on a computer of a software-defined network (SDN), the program comprising sets of instructions for:

configuring, on a physical network interface card (PNIC) connected to the computer, a network adapter to create a logical port that is mapped by the PNIC to a physical port of a virtual distributed switch (VDS) executing on the PNIC, wherein the logical port connects an interface of the computer to the VDS, and instructions to execute the VDS are stored on the PNIC; and defining the set of policies for the logical port to cause the VDS to apply the set of policies to data message flows sent by the PNIC via the logical port, from the set of applications on the computer to one or more other computers of the SDN.

\* \* \* \* \*